United States Patent
Cheng et al.

(10) Patent No.: US 11,687,376 B2
(45) Date of Patent: Jun. 27, 2023

(54) METHOD FOR DATA PROTECTION IN A DATA PROCESSING CLUSTER WITH DYNAMIC PARTITION

(71) Applicants: Baidu USA LLC, Sunnyvale, CA (US); KUNLUNXIN TECHNOLOGY (BEIJING) COMPANY LIMITED, Beijing (CN)

(72) Inventors: Yueqiang Cheng, Sunnyvale, CA (US); Hefei Zhu, Sunnyvale, CA (US)

(73) Assignees: BAIDU USA LLC, Sunnyvale, CA (US); KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 367 days.

(21) Appl. No.: 16/899,865

(22) Filed: Jun. 12, 2020

(65) Prior Publication Data
US 2021/0389993 A1    Dec. 16, 2021

(51) Int. Cl.
G06F 9/50    (2006.01)
G06F 9/4401  (2018.01)
G06F 9/54    (2006.01)

(52) U.S. Cl.
CPC .......... G06F 9/5061 (2013.01); G06F 9/4411 (2013.01); G06F 9/54 (2013.01)

(58) Field of Classification Search
None
See application file for complete search history.

(56) References Cited

U.S. PATENT DOCUMENTS

| | | | | |
|---|---|---|---|---|
| 6,378,027 B1* | 4/2002 | Bealkowski | ........ | G06F 13/4072 709/227 |
| 6,539,438 B1* | 3/2003 | Ledzius | .............. | G06F 15/7867 710/36 |
| 9,979,674 B1* | 5/2018 | Kumar | .................... | H04L 43/16 |
| 11,086,815 B1 | 8/2021 | Santan et al. | | |
| 2002/0069263 A1* | 6/2002 | Sears | ...................... | G06F 9/445 709/218 |
| 2002/0091854 A1* | 7/2002 | Smith | .................... | G06Q 40/00 709/236 |
| 2003/0014750 A1 | 1/2003 | Kamen | | |
| 2007/0197248 A1* | 8/2007 | Reich | ...................... | H04W 4/10 455/518 |

(Continued)

FOREIGN PATENT DOCUMENTS

WO    2017120270 A1    7/2017

*Primary Examiner* — Adam Lee
(74) *Attorney, Agent, or Firm* — Womble Bond Dickinson (US) LLP

(57) ABSTRACT

Systems and methods are disclosed for data protection in a cluster of data processing accelerators (DPAs) using dynamic partitioning of DPAs into, or out of, one or more groups of DPAs in the cluster. A host device instructs each DPA in the cluster to link, or unlink, with one or more DPAs in the cluster to establish groups of DPAs in the cluster. A DPA that is not linked to any DPA is set to a low-power mode. Once grouped, the host device and a DPA can access all resources of the DPA. DPAs in the same group as a first DPA can access non-secure resources, but not secure resources, of the first DPA. DPAs in a different group from the first DPA cannot access any resources of the first DPA. A scheduler in the host device allocates processing tasks for one application or user to a group.

15 Claims, 12 Drawing Sheets

(56) References Cited

U.S. PATENT DOCUMENTS

| | | | |
|---|---|---|---|
| 2007/0260716 A1* | 11/2007 | Gnanasambandam | G06Q 10/06 709/223 |
| 2008/0155100 A1* | 6/2008 | Ahmed | G06F 9/5011 709/226 |
| 2008/0155275 A1 | 6/2008 | Natarajan et al. | |
| 2009/0119743 A1 | 5/2009 | Werner | |
| 2009/0144800 A1* | 6/2009 | Black-Ziegelbein | H04L 63/104 726/1 |
| 2009/0259833 A1 | 10/2009 | Mohrmann et al. | |
| 2010/0328320 A1 | 12/2010 | Kerstna et al. | |
| 2013/0201888 A1* | 8/2013 | Wu | H04W 52/0212 370/311 |
| 2013/0235772 A1* | 9/2013 | Wu | H04L 12/189 370/311 |
| 2013/0282853 A1* | 10/2013 | Jun | G06F 9/544 709/213 |
| 2013/0291007 A1* | 10/2013 | Shimy | H04N 21/4583 725/32 |
| 2014/0173618 A1* | 6/2014 | Neuman | G06F 9/5066 718/104 |
| 2014/0232733 A1* | 8/2014 | Caulkins | G06T 1/60 345/557 |
| 2014/0289417 A1* | 9/2014 | Chan | H04L 67/10 709/226 |
| 2014/0351811 A1* | 11/2014 | Kruglick | G06F 9/45558 718/1 |
| 2015/0063186 A1* | 3/2015 | Kakadia | H04W 4/06 370/312 |
| 2015/0092947 A1* | 4/2015 | Gossain | G11B 27/002 381/58 |
| 2015/0281117 A1* | 10/2015 | Kunde | G06F 9/46 709/226 |
| 2016/0094396 A1 | 3/2016 | Chandrashekhar et al. | |
| 2016/0127480 A1 | 5/2016 | Rose | |
| 2016/0182567 A1 | 6/2016 | Sood et al. | |
| 2016/0247178 A1* | 8/2016 | Gujar | G06Q 30/0208 |
| 2017/0070448 A1 | 3/2017 | Miller | |
| 2017/0171169 A1* | 6/2017 | Lee | H04W 12/033 |
| 2017/0293994 A1* | 10/2017 | Li | G06F 9/5083 |
| 2017/0308504 A1* | 10/2017 | Cook | G06F 9/5083 |
| 2018/0150391 A1 | 5/2018 | Mitchel et al. | |
| 2018/0210530 A1* | 7/2018 | Kwon | G06F 1/3206 |
| 2018/0225237 A1 | 8/2018 | Edirisooriya | |
| 2018/0254999 A1* | 9/2018 | Caffee | H04L 67/60 |
| 2019/0019267 A1* | 1/2019 | Suresh | G06F 9/5044 |
| 2019/0114211 A1* | 4/2019 | Reddipalli | G06F 16/254 |
| 2019/0228159 A1 | 7/2019 | Trikalinou et al. | |
| 2019/0318074 A1 | 10/2019 | Ledwith et al. | |
| 2019/0377591 A1 | 12/2019 | Dimitrov | |
| 2020/0004596 A1 | 1/2020 | Sengupta et al. | |
| 2020/0126551 A1* | 4/2020 | Xiong | G06F 3/167 |
| 2020/0136900 A1 | 4/2020 | Tarrant | |
| 2020/0174838 A1* | 6/2020 | Li | G06F 9/505 |
| 2020/0195502 A1 | 6/2020 | Miyoshi | |
| 2020/0242076 A1* | 7/2020 | Stacey | G06F 16/13 |
| 2020/0344124 A1 | 10/2020 | Christober | |
| 2020/0409733 A1* | 12/2020 | Sankaran | G06F 9/5077 |
| 2021/0019434 A1 | 1/2021 | Bibliowicz | |
| 2021/0026696 A1* | 1/2021 | Chen | G06T 1/20 |
| 2021/0103475 A1* | 4/2021 | Fretz | G06F 9/5022 |
| 2021/0142165 A1* | 5/2021 | Luo | G06F 1/3203 |
| 2021/0200545 A1 | 7/2021 | Marolia et al. | |
| 2021/0319110 A1 | 10/2021 | Edery et al. | |
| 2022/0029955 A1 | 1/2022 | Patel et al. | |
| 2022/0066931 A1 | 3/2022 | Ray et al. | |

* cited by examiner

METHOD FOR DATA PROTECTION IN A DATA PROCESSING CLUSTER WITH DYNAMIC PARTITION

TECHNICAL FIELD

Embodiments of the present disclosure relate generally to data processing accelerators configured in a cluster. More particularly, embodiments of the disclosure relate to data protection in a data processing accelerator cluster, such as may be used to perform artificial intelligence model training and inference.

BACKGROUND

Artificial intelligence (AI) models (also termed, "machine learning models") have been widely utilized recently as AI technology has been deployed in a variety of fields such as image classification, medical diagnosis, or autonomous driving. Similar to an executable image or binary image of a software application, an AI model, when trained, can perform an inference based on a set of attributes to classify as features. Training of an AI model can require a substantial investment in collecting, collating, and filtering of data to generate an AI model that yields useful predictions. In addition, the predictions resulting from use of an AI model may contain personal, sensitive data that users would want protected.

Generating a prediction from an AI model can be a computationally intensive process. To provide adequate computational power for one or more users, a cluster of data processing accelerators (DPAs) can be provided in a cluster. The data processing accelerators are interconnected with one or more communication links. There is a risk that the communications links, and/or one or more data processing accelerators in the cluster, could be comprised such that either the AI model or an inference produced by an AI model could be leaked, stolen, and/or altered.

To process computationally intensive tasks, a cluster of data processing accelerators may be designed to handle a maximum work load. The number of data processing accelerators selected for the maximum workload may generate a substantial amount of heat and energy consumption.

Building a cluster system with a number of data processing accelerators that meet a maximum workload may be a costly endeavor. Cost may motivate gray market manufacturers to produce data processing accelerators that appear visually identical to legitimate name-brand data processing accelerators. A system builder or integrator may not be able to authenticate the data processing accelerators as being manufactured by the brand-name manufacturer. Thus, the system builder cannot assure that the data processing accelerators used in a cluster are as secure as the name-brand data processing accelerators that the builder intended to use in the cluster.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
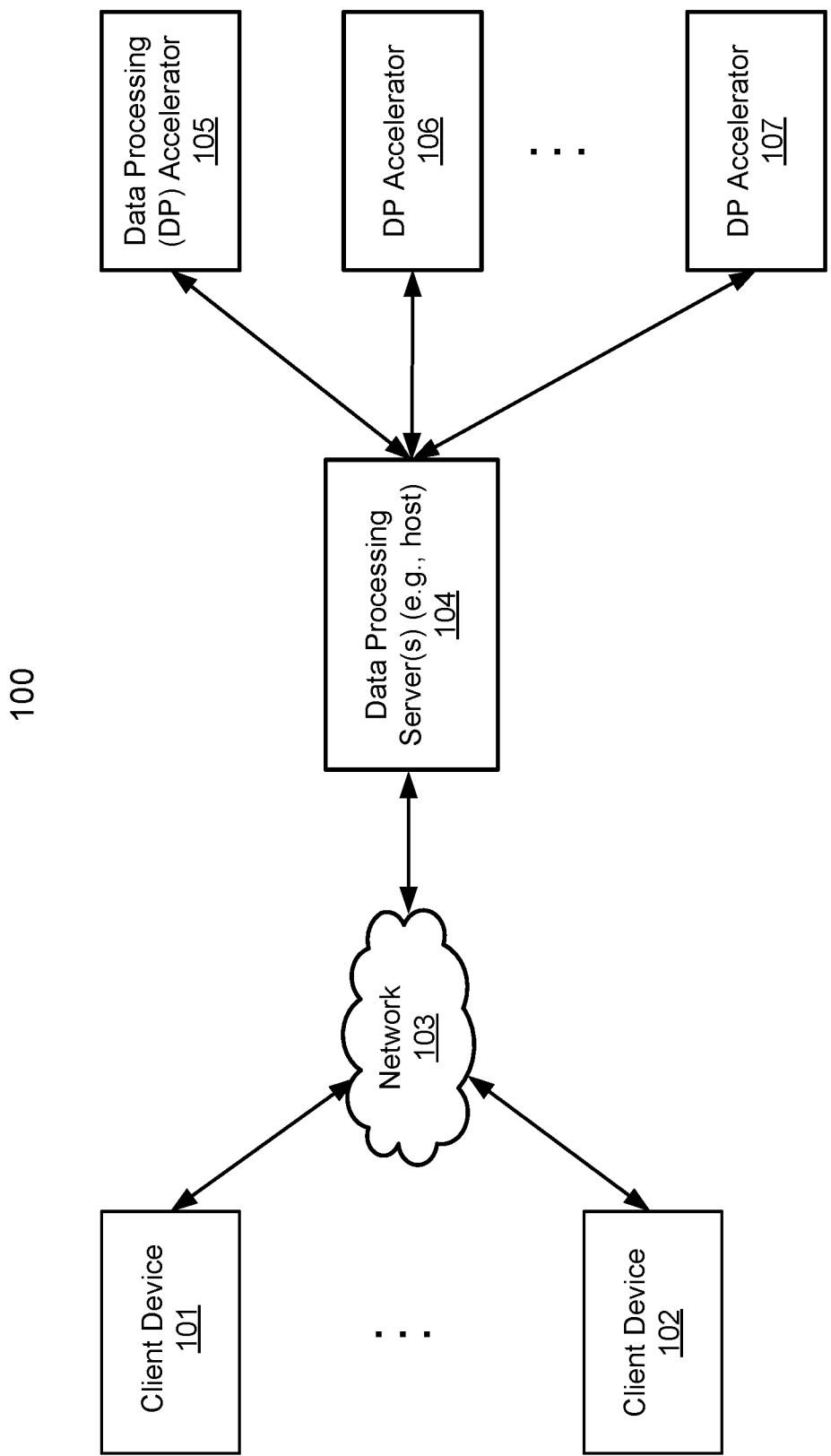
FIG. 1 is a block diagram illustrating a secure processing system, according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The following embodiments relate to usage of a data processing (DP) accelerator to increase processing throughput of certain types of operations that may be offloaded (or delegated) from a host device to the DP accelerator. A DP accelerator can be a general-purpose processing unit (GPU), an artificial intelligence (AI) accelerator, math coprocessor, digital signal processor (DSP), or other type of processor. A DP accelerator can be a proprietary design, such as a Baidu® AI accelerator, or another GPU, and the like. While embodiments are illustrated and described with host device securely coupled to one or more DP accelerators, the concepts described herein can be implemented more generally as a distributed processing system.

DP accelerators can be linked in a cluster that is managed by a host device having a driver that translates application program processing requests into processing tasks for one or more of the DP accelerators. The host device may support one or more virtual machines (VMs) each having a user associated with the corresponding VM. The driver can include a scheduler that schedules application processing requests from a plurality of VMs for processing by one or more of the DP accelerators. In one embodiment, the driver can analyze processing requests in the scheduler to determine how to group the one or more DP accelerators in the cluster, and whether to instruct one or more DP accelerators to unlink from a group and go into a low-power state to reduce heat and conserve energy.

The host device and the DP accelerator can be interconnected via a high-speed bus, such as a peripheral component interconnect express (PCIe), or other high-speed bus. The host device and DP accelerator can exchange keys and initiate a secure channel over the PCIe bus before performing operations of the aspects of the invention described below. Some of the operations include the DP accelerator using an artificial intelligence (AI) model to perform inferences using data provided by the host device. Before the AI model inferences are trusted by the host device, the host device can engage the DP accelerator to perform one or more validation tests, described below, including determining a watermark of the AI model. In some embodiments and operations, the DP accelerator is not aware that the host device is testing the validity of results produced by the DP accelerator.

A host device may include central processing unit (CPU) and a DP accelerator may be a general-purpose processing unit (GPU) coupled to the CPU over a bus or interconnect. A DP accelerator may be implemented in a form of an application-specific integrated circuit (ASIC), a field programmable gate array (FPGA) device, or other forms of integrated circuits (ICs). Alternatively, the host processor may be a part of a primary data processing system while a DP accelerator may be one of many distributed systems as secondary systems that the primary system can offload its data processing tasks remotely over a network (e.g., cloud computing systems such as a software as a service or SaaS system, or a platform as a service or PaaS system). A link between a host processor and a DP accelerator may be a peripheral component interconnect express (PCIe) link or a network connection such as Ethernet connection. Each DP accelerator can include one or more link registers that enable (link up) or disable (link down) a communication link with another DP accelerator.

In a first aspect, a method of configuring a cluster made up of a plurality of data processing accelerators (DPAs), includes: receiving, by each of the plurality of DPAs, a configuration policy for the plurality of DPAs. In one embodiment, all DPAs in the cluster receive the same configuration policy, and the configuration policy contains instructions about how each DPA in the plurality of DPAs is to configure itself. The configuration of each DPA can be, and typically is, different from the configuration of other DPAs in the cluster. Configuration can include the DPA making (link up), or breaking (link down), a communication link between the DPA and one or more other DPAs in the cluster to form one or more linked groups of DPAs within the cluster.

When forming a group of DPAs, each DPA generates a communication link to at least one DPA in the group of DPAs. A communication path between a first DPA in a group and a second DPA in the group is generated either by a direct communication link between the first and second DPA, or an indirect path via at least a third DPA through which the first and second DPAs form a communication path. Each DPA is communicatively linked to a host system. During configuration of the DPAs, each DPA maintains its link to the host device. After the DPAs are configured, a DPA can only communicate with the host device and one or more of the DPAs in one group of DPAs in the cluster. There can be multiple, non-overlapping groups of DPAs in the cluster.

Each DPA can have sensitive (secure) resources and non-sensitive (non-secure) resources. Resources can include memory, storage, processor(s), and functional modules such as a cryptographic module, a true random number generating module, a key manager and a key store. After configuration, each DPA in a group can access non-secure resources of any DPA in the group to which the DPA has a communication path. No DPA in a group can communicate with, or access resources of, a DPA in another group. The host device and a DPA can always access all resources of the DPA.

In a second aspect, a method of partitioning resources of plurality of communicatively coupled as a cluster of DPAs includes: partitioning the resources of each DPA into sensitive (secure) and non-sensitive (non-secure) resources. Sensitive resources may include memory that stores one or more artificial intelligence (AI) models, a cryptographic module, a secure processor, a storage or memory that holds one or more kernels, a cryptographic key manager and a cryptographic key store, and any other sensitive data or processing resource that may need to be protected. Non-secure resources can include general purpose processor(s), memory holding interim computations, software modules, or other resources that do not require strong protection. Static partitioning of resources of a DPA can be in accordance with a specification governing the DPAs of the cluster. The specification is implemented in a driver in a host system that allocates work to individual DPAs or groups of DPAs in the cluster. Static partitioning of resources can be implemented in firmware or hardware.

In one embodiment, sensitive resources are accessed within a predetermined memory address space, while non-sensitive resources are accessed within a second predetermined memory address space. In one embodiment, the address spaces are determined at manufacture time of the DPA. Access protection for sensitive resources can include permitting access to sensitive and non-sensitive resources by the host device and by the DPA whose resources are being accessed. Other DPAs can only access non-sensitive resources of the DPA and cannot access sensitive resources of the DPA. A host device can instruct a DPA to access the DPAs own sensitive resources. For example, host device can transmit an artificial intelligence (AI) model to a DPA and instruct the DPA to store the AI model in sensitive memory, or instruct the DPA to perform a cryptographic operation using a cryptographic module in secure storage of a sensitive resource partition.

In a third aspect, a host device can instruct each data processing accelerator (DPA) in a cluster to dynamically repartition itself into, or out of, a group of DPAs in the cluster. A method of configuring a plurality of data processing accelerators (DPAs) communicatively coupled to a host device, can include receiving, from a driver of the host device, by each DPA in a cluster of DPAs, configuration instructions specific to the DPA to configure the DPA into, or out of, a group of the DPAs in the cluster. Each DPA configures itself according to instructions received from the host device.

In response to an instruction indicating that the DPA is to join a group of DPAs in the cluster, the configuring can include generating, by the DPA, a communication link to at least one DPA in the group, otherwise the DPA breaks communication links between the DPA and all DPAs in the group. After the configuring of all DPAs in the cluster is completed, each DPA is either communicatively linked to one group of DPAs in the cluster, or the DPA is not communicatively linked to a group. There can be a plurality of groups of in the cluster. For example, a cluster of eight (8) DPAs can be grouped into two (2) groups of four (4) DPAs each. Groups of DPAs are non-overlapping. A DPA is a member of at most one group in the cluster at any time.

In one embodiment, a DPA may not be instructed to join a group of DPAs. In such case, the DPA can be instructed to set itself to a lower-power state. The driver in the host device can assign a single user or single application to one group and a different application or user to another group. The driver can, at any time, send instructions to one or more DPAs to reconfigure themselves to join, or leave, a group of DPAs. For example, eight (8) DPAs may initially be configured into two (2) groups of (4) DPAs. The driver can later instruct two (2) of the DPAs in one of the groups of (4) DPAs to leave their group, break all communication links with DPAs in the group, and go to a low-power state, such that the cluster then comprises a group of four (4) DPAs, a group of two (2) DPAs and two (2) DPAs that are not currently being used and are set to a low-power state. Driver of the host device maintains a scheduler of processing tasks that are to be allocated different groups of the cluster. When driver determines that less than all DPAs are needed to perform the processing tasks in the scheduler, driver can instruct one or more DPAs to leave a group and go to a low-power state to reduce energy consumption and reduced generated heat.

In a fourth aspect, a cluster of data processing accelerators (DPAs) may contain a plurality of DPAs, one or more of which may be a third party DPA which may not be trustworthy. In the fourth aspect, data protection in the cluster is accomplished by authenticating a DPA before permitting the DPA to access non-sensitive resources of another DPA. The DPAs are organized in a cluster, and the cluster is communicatively coupled to a host device having a driver that communicates with the DPAs of the cluster. The cluster of DPAs may, or may not, be organized into groups.

A first DPA receives a request from a second DPA in the cluster to access a resource of the first DPA. If the request is for a sensitive resource of the first DPA, the first DPA denies the request. Only the host device or a DPA can access the sensitive resources of the DPA. If the request is for a non-sensitive resource, then the first DPA will authenticate the second DPA. If the second DPA is successfully authenticated, then the second DPA is permitted access to the non-sensitive resource of the first DPA. Authenticating the second DPA includes: the first DPA generating and transmitting a random number to the second DPA; the first DPA receiving an output from the second DPA that is based upon the random number and a shared secret between the first DPA and the second DPA; and the first DPA generating an output from the shared secret number and random number.

If the output generated by the first DPA matches the output received from the second DPA, the second DPA is deemed authenticated, otherwise the second DPA is not deemed authenticated. In one embodiment, if the second DPA is not authenticated, the first DPA breaks a communication link between the first DPA and the second DPA. In addition, or alternatively, if the second DPA is not authenticated, then the first DPA can transmit a notification of non-authentication to all other DPAs to which the first DPA has a communication link, except the second DPA. In one embodiment, if the second DPA is not authenticated, the first DPA can transmit a notification of non-authentication to the host device. The host device can then instruct all DPAs to break any communication link(s) they may have with the second DPA.

Authentication relies upon a shared secret between the first DPA and a second DPA. The authentication process is a test to determine whether or not the second DPA has the shared secret. The shared secret can be a one-way function that produces an output, given an input, and the one-way function is not determinable from the output of the one-way function. In one embodiment, the shared secret is embedded in the first and second DPA, and is updateable, such as by an update from a manufacturer of the first and second DPA.

Any of the above functionality can be programmed as executable instructions onto one or more non-transitory computer-readable media. When the executable instructions are executed by a processing system having at least one hardware processor, the processing systems causes the functionality to be implemented. Any of the above functionality can be implemented by a processing system having at least one hardware processor, coupled to a memory programmed with executable instructions that, when executed, cause the processing system to implement the functionality.

FIG. 1 is a block diagram illustrating secure processing system, according to some embodiments. Referring to FIG. 1, system configuration 100 includes, but is not limited to, one or more client devices 101-102 communicatively coupled to DP server 104 (e.g. host) over network 103. Client devices 101-102 may be any type of client devices such as a personal computer (e.g., desktops, laptops, and tablets), a "thin" client, a personal digital assistant (PDA), a Web enabled appliance, a Smart watch, or a mobile phone (e.g., Smartphone), etc. Alternatively, client devices 101-102 may be other servers. In one embodiment, the one or more servers 101-102 host one or more virtual machines which are the clients of the data processing server(s) 104. Network 103 may be any type of network such as a local area network (LAN), a wide area network (WAN) such as the Internet, a high-speed bus, or a combination thereof, wired or wireless.

Server(s) (e.g., host) 104 may be any kind of servers or a cluster of servers, such as Web or cloud servers, application servers, backend servers, or a combination thereof. Server 104 further includes an interface (not shown) to allow a client such as client devices 101-102 to access resources or services (such as resources and services provided by DP accelerators via server 104) provided by server 104. For example, server 104 may be a cloud server or a server of a data center that provides a variety of cloud services to clients, such as, for example, cloud storage, cloud computing services, artificial intelligence training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

For example, a client can be a user application of client device 101 (e.g., Web browser, an application). The client may send or transmit an instruction (e.g., AI training, inference instruction, etc.) for execution to server 104 and the instruction is received by server 104 via the interface over network 103. In response to the instruction, server 104 communicates with DP accelerators 105-107 to fulfill the execution of the instruction. In some embodiments, the instruction is a machine learning type of instruction where DP accelerators, as dedicated machines or processors, can execute the instruction many times faster than execution by server 104. Server 104 thus can control/manage an execution job for the one or more DP accelerators in a distributed fashion. Server 104 then returns an execution result to a client device 101-102. A DP accelerator or AI accelerator may include one or more dedicated processors such as a Baidu® artificial intelligence (AI) chipset available from Baidu, Inc.® or alternatively, the DP accelerator may be an AI chipset from another AI chipset provider.

According to one embodiment, each of the applications accessing any of DP accelerators 105-107 hosted by data processing server 104 (also referred to as a host) may verify that the application is provided by a trusted source or vendor. Each of the applications may be launched and executed within a user memory space and executed by a central processing unit (CPU) of host 104. When an application is configured to access any one of the DP accelerators 105-107, an obscured connection can be established between host 104 and the corresponding one of the DP accelerator 105-107, such that the data exchanged between host 104 and DP accelerators 105-107 is protected against attacks from malware/intrusions.

Figure 2A:
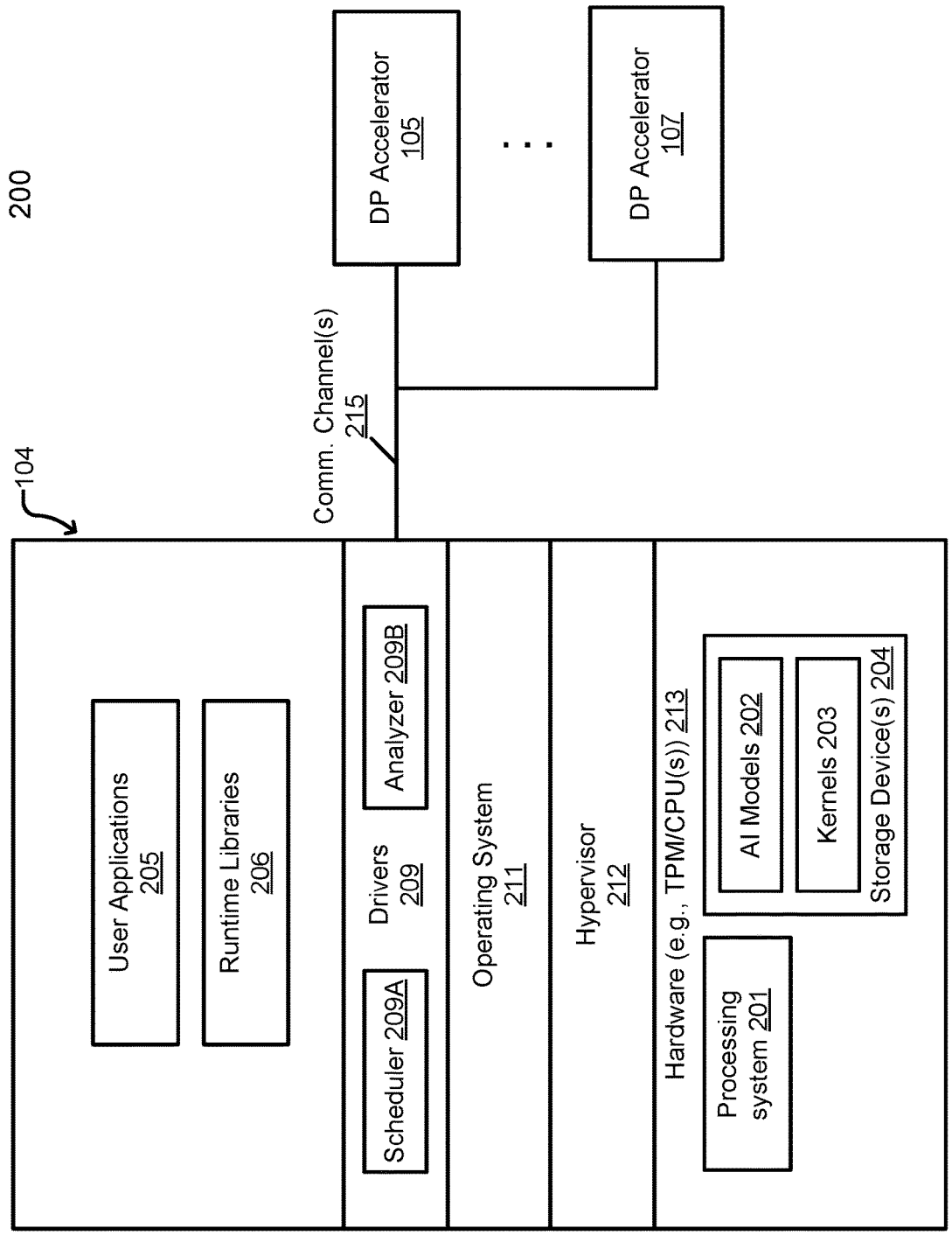
FIGS. 2A and 2B are a block diagrams illustrating a secure computing environment between one or more hosts and one or more data processing accelerators, according to one embodiment.

FIG. 2A is a block diagram illustrating a secure computing environment 200 between one or more hosts and one or more data processing accelerators (DPAs), according to some embodiments. In one embodiment, system 200 provides a protection scheme for obscured communications between host 104 and DP accelerators 105-107 with or without hardware modifications to the DP accelerators 105-107. Host machine or server 104 can be depicted as a system with one or more layers to be protected from intrusion such as user application(s) 205, runtime libraries 206, driver(s) 209, operating system 211, hypervisor 212, and hardware 213 (e.g., central processing unit (CPU) 201 and storage device(s) 204). Below the applications 205 and run-time libraries 206, one or more drivers 209 can be installed to interface to hardware 213 and/or to DP accelerators 105-107.

A driver 209 can include a scheduler 209A that schedules processing tasks requested by one or more user applications 205. Driver 209 can further include an analyzer 209B with logic that analyzes processing tasks scheduled for execution on the DP accelerators 105-107 to determine how to best configure the DP accelerators 105-107 based upon scheduling criteria such as processing throughput, energy consumption, and heat generated by the DP accelerators. Driver 209 can further include one or more policies directed to configuring the DP accelerators to achieve the scheduling criteria. Configuring DP accelerators can include grouping DP accelerators into one or more groups, removing one or more DP accelerators from one or more groups.

DP accelerators not assigned to a group of DP accelerators can be set to a low-power state to save energy and reduce heat. A low-power state can include reducing a clock speed of the DP accelerator or entering a standby state wherein the DP accelerator is still communicatively coupled to the host device and can be brought to a run state wherein the DP accelerator is ready to receive processing tasks from the host device. DP accelerators not assigned to a group can alternatively be left in a powered-up state such that driver 209 can assign work to a single DP accelerator that is not a member of a group of DP accelerators.

Configuring DP accelerators can further include instructing one or more DP accelerator to generate a communication link (link up) with one or more other DP accelerators to form a group of DP accelerators within a cluster of DP accelerators. Configuring DP accelerators can further include instructing one or more DP accelerate to break a communication link (link down) between the DP accelerator and one or more other DP accelerators. Link up and link down of a DP accelerator can be governed by one or more link registers in each DP accelerator.

In a policy-based partition embodiment, a DP accelerator configuration policy is a single policy that describes communication links (up or down) for each DP accelerator. While configuration of each DP accelerator can be (and, typically will be) different from the other DP accelerators, the configuration of each DP accelerator is included within the single policy, and each DP accelerator in the cluster receives the same policy. Each DP accelerator then configures itself according to the portion of the policy that describes configuring the DP accelerator. Policy-based partition can be based on an analysis of processing tasks in the scheduler 209A. The analysis can determine an optimal allocation of DP accelerators into groups. In one embodiment, time-share processing tasks within a group of processors, or across multiple groups of processors, to optimize throughput, minimize energy consumption and generated heat. Advantages of policy-based partitioning of DP accelerators into groups include fast partitioning of DP accelerators, flexible scheduling of processing tasks within, or across, groups, time-sharing of DP accelerators and time-sharing of groups.

In a dynamic partition embodiment, a DP accelerator policy is generated for each DP accelerator. The driver 209 can dynamically change the configuration of each DP accelerator, including reorganizing groups of DP accelerators, removing one or more DP accelerators from all groups and setting those DP accelerators to a low-power state. In the dynamic partition embodiment, each group of DP accelerators is assigned to a single user rather than time-sharing the DP accelerators between users. Driver 209 can include analyzer 209B that analyzes processing tasks within the scheduler 209A to determine an optimal grouping of DP accelerators. The analysis can generate a configuration for one or more DP accelerators and the configuration can be deployed to each such DP accelerator to be reconfigured. Advantages of dynamic partitioning include energy saving through setting one or more processors to a low-power state, and user-dedicated processing for a DP accelerator or a group of DP accelerators, rather than time-slicing between users.

Hardware 213 can include a processing system 201 having one or more processor(s) 201. Hardware 213 can further include and storage device(s) 204. Storage device(s) 204 can include one or more artificial intelligence (AI) models 202, and one or more kernels 203. Kernels 203 can include signature kernels, watermark-enabled kernels, encryption and/or decryption kernels, and the like. A signature kernel, when executed, can digitally sign any input in accordance with the programming of the kernel. A watermark-enabled kernel can extract a watermark from a data object (e.g. an AI model or other data object). A watermark-enabled kernel can also implant a watermark into an AI model, an inference output, or other data object.

A watermark kernel (e.g. a watermark inherited kernel) can inherit a watermark from another data object and implant that watermark into a different object, such as an inference output or an AI model. A watermark, as used herein, is an identifier associated with, and can be implanted into, an AI model or an inference generated by an AI model. For example, a watermark may be implanted in one or more weight variables or bias variables. Alternatively, one or more nodes (e.g., fake nodes that are not used or unlikely used by the artificial intelligence model) may be created to implant or store the watermark.

Host machine 104 may be a CPU system which can control and manage execution of jobs on the host machine 104 and/or DP accelerators 105-107. In order to secure/obscure a communication channel 215 between DP accelerators 105-107 and host machine 104, different components may be required to protect different layers of the host system that are prone to data intrusions or attacks.

System 200 includes host system 104 and DP accelerators 105-107 according to some embodiments. There can be any number of DP accelerators. DP accelerators can include Baidu® AI chipsets or another AI chipset such as a graphical processing units (GPUs) that can perform artificial intelligence (AI)-intensive computing tasks. In one embodiment, host system 104 includes a hardware that has one or more CPU(s) 213 optionally equipped with a security module (such as an optional trusted platform module (TPM)) within host machine 104. The optional TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the optional TPM chip and cannot be accessed by software. Critical sections of firmware and software can then be hashed by the EK or EC before they are executed to protect the system against unauthorized firmware and software modifications. The optional TPM chip on the host machine can thus be used as a root of trust for secure boot.

The optional TPM chip can also secure driver(s) 209 and operating system (OS) 211 in a working kernel space to communicate with the DP accelerators 105-107. Here, driver 209 is provided by a DP accelerator vendor and can serve as a driver 209 for the user applications 205 to control a communication channel(s) 215 between host and DP accelerators. Because the optional TPM chip and secure boot processor protects the OS 211 and drivers 209 in their kernel space, TPM also effectively protects the driver 209 and OS 211.

Since communication channels 215 for DP accelerators 105-107 may be exclusively used by the OS 211 and driver 209, communication channels 215 can be secured through the optional TPM chip. In one embodiment, communication channels 215 include a peripheral component interconnect (PCI) or peripheral component interconnect express (PCIE) channel. In one embodiment, communication channels 215 are obscured communication channels.

Runtime libraries 206 can convert application programming interface (API) calls to commands for execution, configuration, and/or control of the DP accelerators. In one embodiment, runtime libraries 206 provide a predetermined set of (e.g., predefined) kernels for execution by the user applications. In one embodiment, the kernels may be stored in storage device(s) 204 as kernels 203.

The operating system(s) 211 may be any Linux® distributions, UNIX®, Windows® OS, or Mac® OS, or other operating system.

The system can boot up through an optional TPM-based secure boot. The optional TPM secure boot ensures only a signed/certified operating system 211 and accelerator driver 209 are launched in a kernel space that provides the accelerator services. In one embodiment, the operating 211 system can be loaded through a hypervisor (212). A hypervisor or a virtual machine manager 212 is a computer software, firmware, or hardware that creates and runs virtual machines. A kernel space is a declarative region or scope where kernels (i.e., a predetermined set of (e.g., predefined) functions for execution) are identified to provide functionalities and services to user applications. In the event that integrity of the system is compromised, optional TPM secure boot may fail to boot up and instead shuts down the system.

After booting, runtime libraries 206 run a user application 205. In one embodiment, user application 205 and runtime libraries 206 are statically linked and launched together. In another embodiment, runtime library 206 is launched first and then user application 205 is dynamically loaded. Statically linked libraries are libraries linked to an application at compile time. Dynamic loading can be performed by a dynamic linker. Dynamic linker loads and links shared libraries for running user applications at runtime. Here, user applications 205 and runtime libraries 206 are visible to each other at runtime, e.g., all process data are visible to each other.

In one embodiment, the user application 205 can only call a kernel from a set of kernels as predetermined by runtime libraries 206. In another aspect, user application 205 and runtime libraries 206 are hardened with a side channel free algorithm to defend against side channel attacks such as cache-based side channel attacks. A side channel attack is any attack based on information gained from the implementation of a computer system, rather than weaknesses in the implemented algorithm itself (e.g. cryptanalysis and software bugs). Examples of side channel attacks include cache attacks which are attacks based on an attacker's ability to monitor a cache of a shared physical system in a virtualized environment or a cloud environment. Hardening can include masking of the cache, outputs generated by the algorithms to be placed on the cache. Next, when the user application finishes execution, the user application terminates its execution and exits.

In one embodiment, the set of kernels 203 include obfuscation kernel algorithms. In one embodiment, the obfuscation kernel algorithms can be symmetric or asymmetric algorithms. A symmetric obfuscation algorithm can obfuscate and de-obfuscate data communications using a same algorithm. An asymmetric obfuscation algorithm requires a pair of algorithms, where a first of the pair is used to obfuscate and the second of the pair is used to de-obfuscate, or vice versa. In another embodiment, an asymmetric obfuscation algorithm includes a single obfuscation algorithm used to obfuscate a data set but the data set is not intended to be de-obfuscated, e.g., there is absent a counterpart de-obfuscation algorithm.

Obfuscation refers to obscuring of an intended meaning of a communication by making the communication message difficult to understand, usually with confusing and ambiguous language. Obscured data is harder and more complex to reverse engineering. An obfuscation algorithm can be applied before data is communicated to obscure (cipher/decipher) the data communication reducing a chance of eavesdrop. In one embodiment, the obfuscation algorithm can further include an encryption scheme to further encrypt the obfuscated data for an additional layer of protection. Unlike encryption, which may be computationally intensive, obfuscation algorithms may simplify the computations.

Some obfuscation techniques can include but are not limited to, letter obfuscation, name obfuscation, data obfuscation, control flow obfuscation, etc. Letter obfuscation is a process to replace one or more letters in a data with a specific alternate letter, rendering the data meaningless. Examples of letter obfuscation include a letter rotate function, where each letter is shifted along, or rotated, a predetermine number of places along the alphabet. Another example is to reorder or jumble up the letters based on a specific pattern. Name obfuscation is a process to replace specific targeted strings with meaningless strings. Control flow obfuscation can change the order of control flow in a program with additive code (insertion of dead code, inserting uncontrolled jump, inserting alternative structures) to hide a true control flow of an algorithm/AI model.

In summary, system 200 provides multiple layers of protection for DP accelerators (for data transmissions including machine learning models, training data, and inference outputs) from loss of data confidential and integrity. System 200 can include an optional TPM-based secure boot protection layer and a kernel validation/verification layer. System 200 can include applications that use side-channel free algorithms so as to defend against side channel attacks, such as cache based side channel attacks.

Runtime 206 can provide obfuscation kernel algorithms to obfuscate data communication between a host 104 and DP accelerators 105-107. In one embodiment, the obfuscation can be paired with a cryptography scheme. In another embodiment, the obfuscation is the sole protection scheme and cryptography-based hardware is rendered unnecessary for the DP accelerators.

Figure 2B:
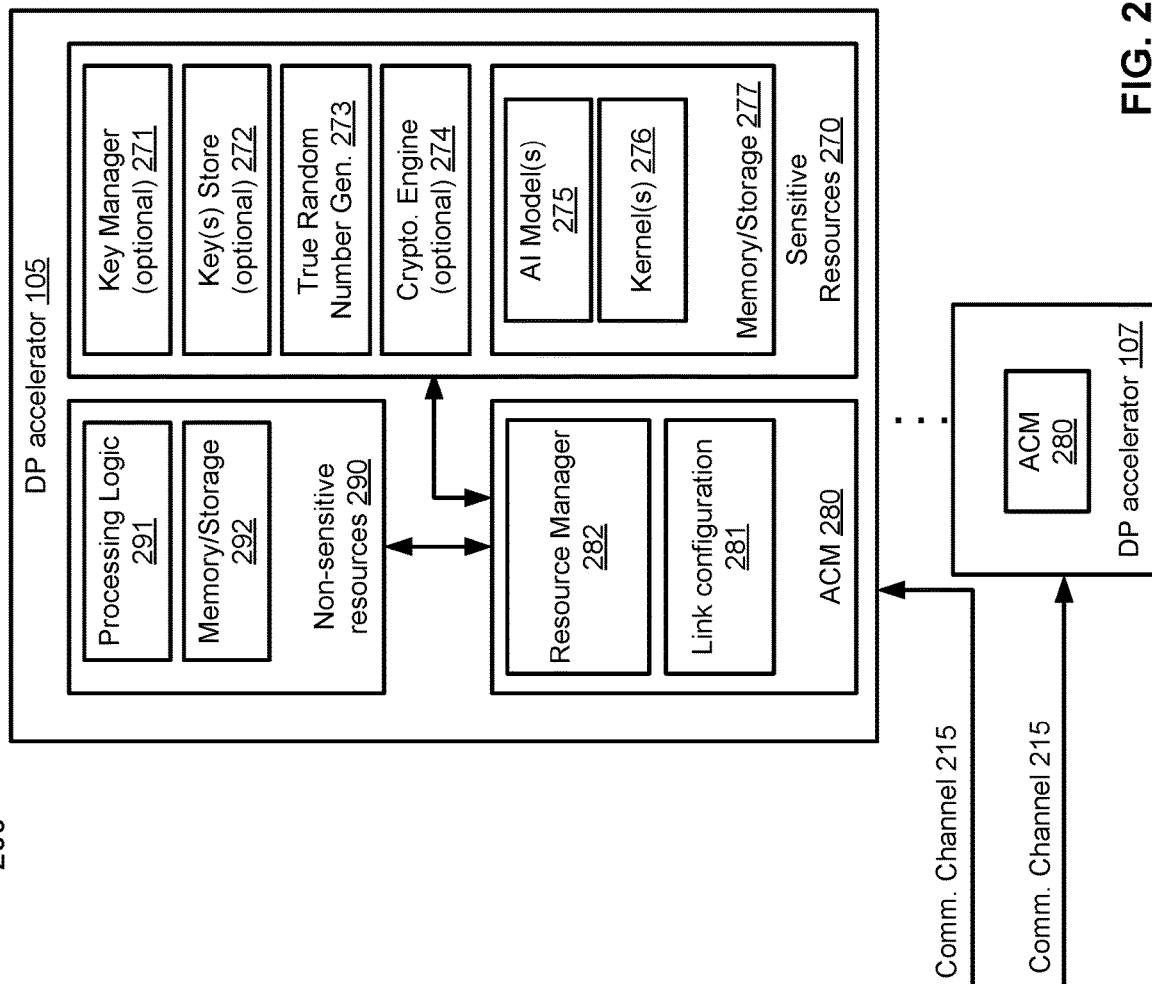
Figure 2B:
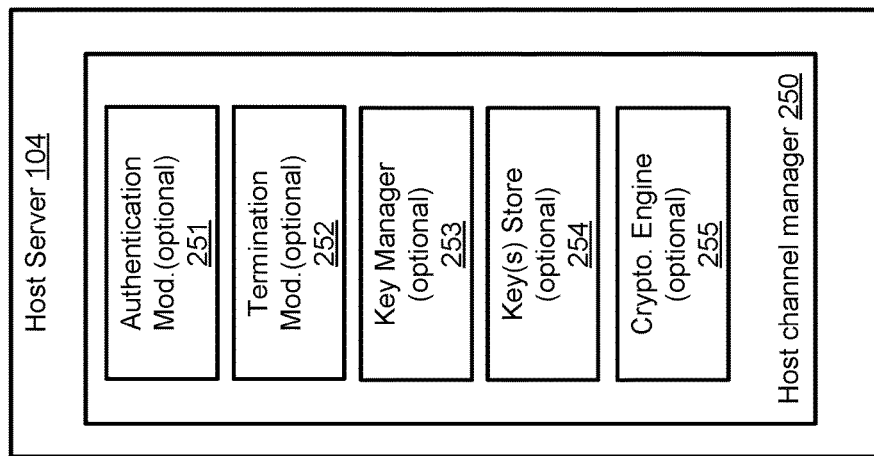

FIG. 2B is a block diagram illustrating a secure computing environment between one or more hosts and one or more data processing (DP) accelerators, according to one embodiment. In one embodiment, host channel manager (HCM) 250 includes optional authentication module 251, optional termination module 252, optional key manager 253, optional key(s) store 254, and optional cryptography engine 255. Optional authentication module 251 can authenticate a user application running on host server 104 for permission to access or use a resource of a DP accelerator 105. HCM 250 can communicate with accelerator channel manager (ACM) 280 of DP accelerator 215 via communication channel 215.

Optional termination module 252 can terminate a connection (e.g., channels associated with the connection would be terminated). Optional key manager 253 can manage (e.g., create or destroy) asymmetric key pairs or symmetric keys for encryption/decryption of one or more data packets for different secure data exchange channels. Here, each user application (as part of user applications 205 of FIG. 2A) can correspond or map to different secure data exchange channels, on a one-to-many relationship, and each data exchange channel can correspond to a DP accelerator 105. Each application can utilize a plurality of session keys, where each session key is for a secure channel corresponding to a DP accelerator (e.g., accelerators 105-107). Optional key(s) store 254 can store encryption asymmetric key pairs or symmetric keys. Optional cryptography engine 255 can encrypt or decrypt a data packet for the data exchanged through any of the secure channels. Note that some of these modules can be integrated into fewer modules.

In one embodiment, DP accelerator 105 includes ACM 280, non-sensitive resources 290, and sensitive resources 270. ACM 280 is a counterpart module corresponding to HCM 250 responsible for managing communications between host 104 and DP accelerator 105 such as, for example, resource access control. ACM 280 includes a link configuration module 281 that cooperates with HCM 250 of host server 104 to establish communication channel 215 between host server 104 and DP accelerator 105. ACM 280 further includes resource manager 282. Resource manager 282 enforces restricted access to sensitive resources 270 and non-sensitive resources 290. In one embodiment, sensitive resources 270 occupy a first range of address space within DP accelerator 105. Non-sensitive resources 290 occupy a second range of address space within DP accelerator 105. In one embodiment, the first and second address spaces are mutually exclusive and non-overlapping. In one embodiment, resource manager 282 further contains logic (e.g., access control logic) that permits access by host server 104 to both sensitive resources 270 and non-sensitive resources 280. In one embodiment, resource manager 282 enforces an access and configuration policy received from host server 104, as further described below.

Sensitive resources 270 can include optional key manager 271, optional key(s) store 272, true random number generator 273, optional cryptography engine 274, and memory/storage 277. Optional key manager 271 can manage (e.g., generate, safe keep, and/or destroy) asymmetric key pairs or symmetric keys. Optional key(s) store 272 can store the cryptography asymmetric key pairs or symmetric keys in secure storage within the sensitive resources 270. True random number generator 273 can generate seeds for key generation and cryptographic engine 274 uses, such as authenticating a linked DP accelerator. Optional cryptography engine 274 can encrypt or decrypt key information or data packets for data exchanges. Memory/storage 277 can include storage for AI models 275 and kernels 276. Kernels 276 can include watermark kernel(s) (including inherited watermark kernels watermark-enabled kernels, watermark-signature kernels, et al.), encryption and decryption kernels, and associated data.

DP accelerator 105 can further include non-sensitive resources 290. Non-sensitive resources 290 can include one or more processors or processing logic 291 and memory/storage 292. Processor or processing logic 192 is capable of executing instructions or programs to perform a variety of processing tasks such as AI tasks (e.g., machine-learning processes).

Link configuration module 281 is responsible for establishing or connecting a link or path from a DP accelerator to another DP accelerator, or terminating or disconnecting a link or path from a DP accelerator to another DP accelerator. In one embodiment, in response to a request (e.g., from a host) to join a group of DP accelerators, link configuration module 281 establish a link or path from the corresponding DP accelerator to at least some of the DP accelerators in the group or cluster, such that the DP accelerator can communicate with other DP accelerators, for example, accessing resources of the other DP accelerators for AI processing. Similarly, in response to a request to switch from a first group of DP accelerators to a second group of DP accelerators, link configuration module 281 terminates an existing link of the corresponding DP accelerator from the first group, and establish a new link to the second group of DP accelerators.

In one embodiment, DP accelerator 105 further includes an AI processing unit (not shown), which may include an AI training unit and an AI inference unit. The AI training and inference units may be integrated into a single unit in sensitive resources 270. The AI training module is configured to train an AI model using a set of training data. The AI model to be trained and the training data may be received from host system 104 via communication link 215. In one embodiment, training data can be stored in non-sensitive resources 290. The AI model inference unit can be configured to execute a trained artificial intelligence model on a set of input data (e.g., set of input features) to infer and classify the input data. For example, an image may be input to an AI model to classify whether the image contains a person, a landscape, etc. The trained AI model and the input data may also be received from host system 104 via interface 140 over communication link 215.

In one embodiment, a watermark unit (not shown) in sensitive resources 270 may include a watermark generator, and a watermark inscriber (also termed, "watermark implanter"). Watermark unit (not shown) may include a watermark kernel executor or kernel processor (not shown) of sensitive resources 270 to execute a kernel 276. In an embodiment, a kernel may be received from host 104, or retrieved from persistent or non-persistent storage, and executed in kernel memory 276 in sensitive resources 270 of DP accelerator 105. The watermark generator is configured to generate a watermark using a predetermined watermark algorithm. Alternatively, the watermark generator can inherit a watermark from an existing watermark or extract a watermark from another data structure or data object, such as an artificial intelligence model or a set of input data, which may be received from host system 104. The watermark implanter is configured to inscribe or implant a watermark into a data structure such as an artificial intelligence model or output data generated by an artificial intelligence model. The artificial intelligence model or output data having a watermark implanted therein may be returned from DP accelerator 105 to host system 104 over communication link 215. Note that DP accelerators 105-107 have the identical or similar structures or components and the description concerning a DP accelerator would be applicable to all DP accelerators throughout this application.

Figure 3:
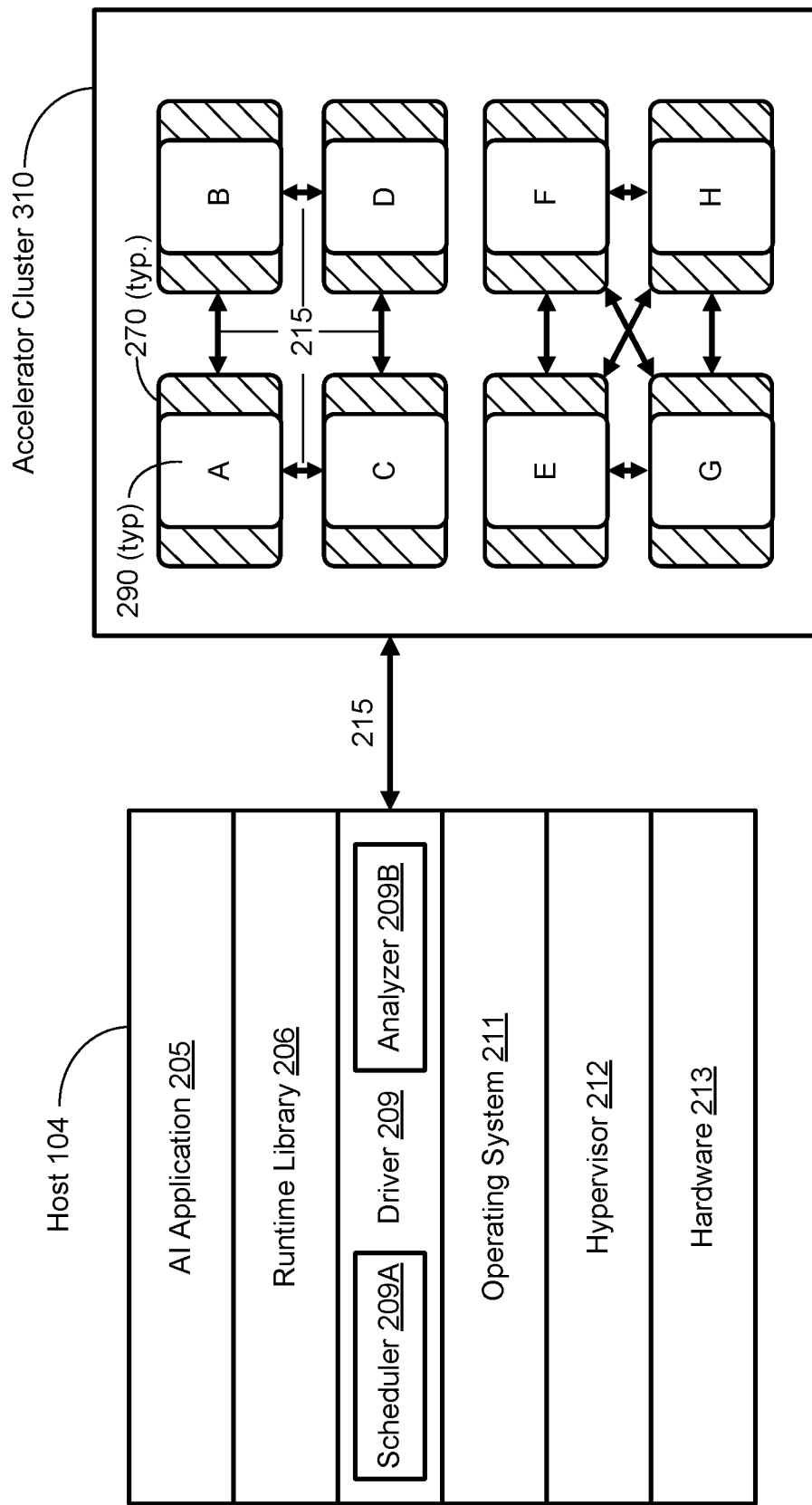
FIG. 3 is a block diagram illustrating a host controlling a cluster of data processing accelerators, each data processing accelerator having secure resources and non-secure resources, according to an embodiment.

FIG. 3 illustrates, in block form, a host 104 controlling a cluster 310 of data processing (DP) accelerators, according to an embodiment. Host 104 can include application(s) 205, e.g. artificial intelligence (AI) applications, runtime library 206, one or more drivers 209, an operating system 211, and hardware 213, each of which has been described above with reference to FIGS. 2A and 2B and will not be repeated here. In a virtual computing embodiment, host 104 can further include a hypervisor 212, such as VMware® vSphere/ESXi® or Microsoft® Hyper-V®. Hypervisor 212 can be a type 1 "bare metal" or "native" hypervisor that runs directly on a physical server. In one embodiment, hypervisor 212 can be a type 2 hypervisor that loads inside an operating system 211 like any other application and is managed by the operating system 211. In either case, hypervisor 212 can support one or more virtual machines (not shown) on the host 104. In such an aspect, the virtual machines (not shown) can be treated as the client devices 101 and 102 of FIG. 1.

Data processing (DP) accelerator cluster 310 can comprise DP accelerators 105-107 described above with reference to FIGS. 2A and 2B. With reference to FIG. 3, DP accelerator cluster 310 can include, e.g., eight (8) DP accelerators labeled A through H. Each DP accelerator in the accelerator cluster 310 can have one or more communication links 215 to one or more other DP accelerators in the accelerator cluster 310. DP accelerator communication links 215 are described above with reference to FIGS. 2A and 2B. Each DP accelerator in the cluster 310 is configured according to a policy received from host 104 driver 209. Each DP accelerator in the cluster 310 can have sensitive resources 270 and non-sensitive 290 resources.

In the example shown in FIG. 3, DP accelerators A-D are configured as a first group of four (4) DP accelerators. DP accelerators E-H are configured in a second group of four (4) DP accelerators. In the first group of DP accelerators, each DP accelerator has a communication link either directly to another accelerator, e.g. A-B, A-C, B-D, and C-D, or has a communication path to another accelerator via one or more intervening accelerators, e.g. A-B-D, A-C-D, etc. The second group is shown as having direct communication links between each DP accelerators in the second group and each other DP accelerator in the second group. Driver 209 can generate a policy wherein each DP accelerator in a group has a direct communication link with each or some of other DP accelerators in the group. In the case of the first group, driver 209 can generate a policy that further includes, e.g., instructions for DP accelerator A and D to generate a communication link with one another and DP accelerators B and C to generate a communication link with one another. There can be any number of DP accelerators in a cluster 310, configured into any number of groups.

In a static policy-based embodiment, a single policy which defines the configuration for each of the DP accelerators and is transmitted from the driver 209 to the all DP accelerators in the cluster 310. In an embodiment, the driver 209 can transmit the policy in a single broadcast message to all DP accelerators in the cluster. Each DP accelerator reads the policy and makes (link up) or breaks (link down) a communication link with one or more DP accelerators in the cluster 310, thereby configuring the DP accelerators into one or more groups. In FIG. 3, there are eight (8) DP accelerators configured as a two groups of four (4) DP accelerators. Each DP accelerator in a group has either a direct communication link to each DP accelerator in the group or has an indirect communication path to each DP accelerator in the group via one or more DP accelerators to which the DP accelerator has a direct communication link. In the static policy-based environment, scheduler 209A of driver 209 can schedule processing tasks on one or more groups of the cluster 310 using time-slicing between applications 205 and/or users of virtual machines. The static policy can be changed by the driver 209 generating a new policy that describes configuration for each of the DP accelerators in cluster 310.

Each DP accelerator (e.g., link configuration module 281 and/or resource manager 282) in the cluster 310 reconfigures itself in accordance with the policy, making (link up) or breaking (link down) communication links between the DP accelerator and one or more other DP accelerators in the cluster 310. Static policy-based configuration is fast in that the configuration is transmitted in a single, e.g. broadcast, message, and each DP accelerator configures itself substantially in parallel with other DP accelerators in the cluster 310. Since the policy for all DP accelerators is transmitted to all DP accelerators at a same time, configuration can occur very quickly. For example, if the policy includes instructions to DP accelerator "A" to generate a link DP accelerator "B", then the policy also has instructions that DP accelerator B is to generate a link to DP accelerator A. Each DP accelerator can open their own end of a link substantially simultaneously thereby opening the link between DP accelerator A and DP accelerator B very quickly. In one embodiment, the single policy can be expressed as an adjacency table of DP accelerators.

Static policy-based configuration is also efficient in that it supports time-slice scheduling between different users and supports allocating processing tasks of a user to more than one DP accelerator group in the cluster 310. The static policy can be generated from the analyzer 209B determining characteristics of the processing tasks in the scheduler 209A. For example, scheduler 209A may include a large number of tasks that use a same AI model to perform inferences or further train the AI model. Analyzer can generate a policy that configures a number of DP accelerators to prepare for performing inferences or training on the AI model. Configuration can include identifying a grouping of DP accelerators, and loading one or more AI models into sensitive memory of one or more of the DP accelerators in preparation for the processing tasks in the scheduler 209A.

In a dynamic policy-based embodiment, driver 209 can individually configure each DP accelerator in the cluster 310 to achieve configuration of the DP accelerators. A policy is transmitted separately to each DP accelerator. In practice, in dynamic policy based embodiment, the policies transmitted to each DP accelerator typically differ from one another. The DP accelerator receives the policy and configures itself in accordance with the policy. Configuration includes a DP accelerator configuring itself into, or out of, a group in the cluster 310. A DP accelerator configures itself into a group by making a communication link (link up) with at least one DP accelerator in the group, in accordance with the policy. A DP accelerator leaves a group by breaking a communication link (link down) between the DP accelerator and all DP accelerators in the group. After configuration, if a DP accelerator is not a member of any group of DP accelerators, the DP accelerator can be set to a low-power model to reduce heat and conserve energy. In one embodiment, scheduler 209A assigns a DP accelerator or DP accelerator group to each user or application for which scheduler 209A is scheduling processing tasks to the cluster 310.

Figure 4:
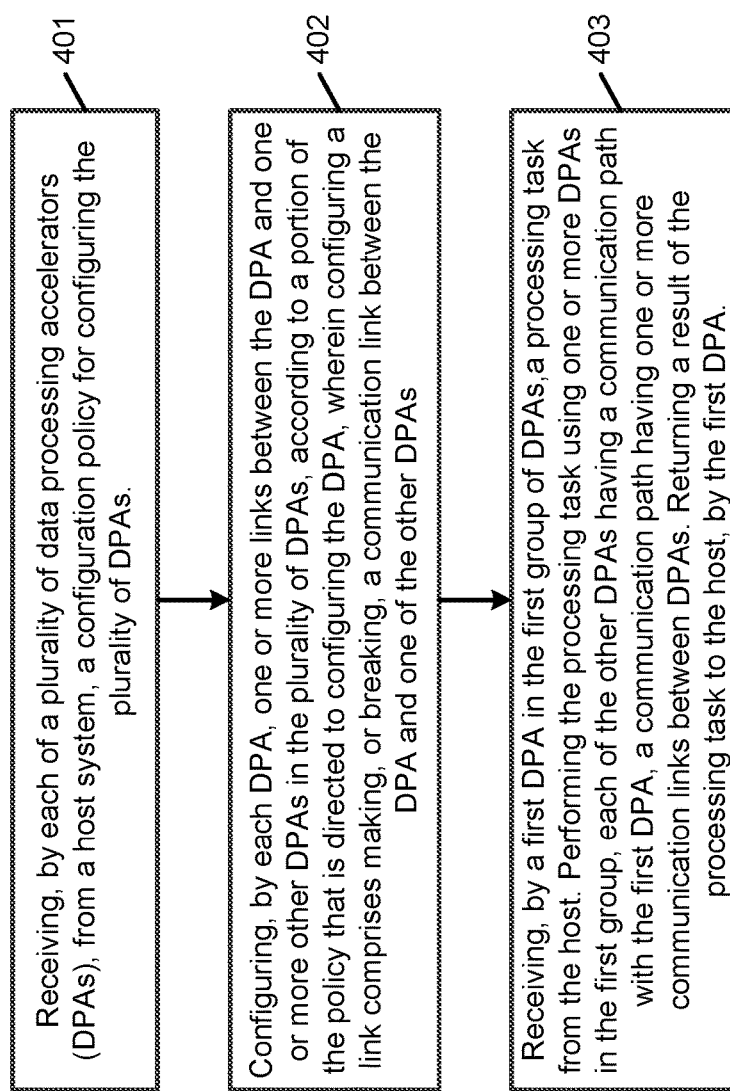
FIG. 4 is a block diagram illustrating a method of protecting data in a cluster of data processing accelerators that are partitioned according to a policy, according to an embodiment.

FIG. 4 is a flow diagram illustrating a method 400 of protecting data in a cluster of data processing accelerators that are partitioned according to a static partition policy. The method 400 is an example implementation of a static policy-based partition of data processing (DP) accelerators into one or more groups within a cluster of DP accelerators. Method 400 may be performed by an ACM of a DP accelerator such as ACM 280.

In operation 401, each of a plurality of DP accelerators receives a configuration policy from a host system. The policy is a single policy that contains configuration information for each of the DP accelerators in the cluster. Each DP accelerator receives the same policy from the host. In one embodiment, the host can broadcast the policy to all DP accelerators in the cluster. DP accelerators cannot broadcast to one another. To prevent corruption of policies sent by the host, DP accelerators are not permitted to use broadcast communication. DP accelerators cannot emulate the host. DP accelerators can only communicate with the host, and one or more other DP accelerators nodes to which a DP accelerator has a communication path or a communication link. In embodiments wherein a DP accelerator does not have a communication link to any other DP accelerator, the DP accelerator can only communication with the host.

In operation 402, each DP accelerator (e.g., link configuration module 281) reads the portion of the policy that applies to the DP accelerator and generates a communication link (link up) to one or more other DP accelerators. For every DP accelerator in the policy that the DP accelerator has not provided an instruction to link up, the DP accelerator asserts a link down (break, terminate, or disconnect communication link). In one embodiment, a DP accelerator may not be instructed to link up with any other DP accelerators. In such aspect, DP accelerator can still receive processing tasks from host device for processing on the DP accelerator.

In operation 403, a first DP accelerator in a first group receives a processing task from the host. The first DP accelerator (e.g., processing logic 291) performs the processing tasks using one or more DP accelerators in the first group. In one embodiment, each of the one or more DP accelerators can a communication path with the DP accelerator. A communication path includes either a direct communication link between the DP accelerator and another DP accelerator of the group, or an indirect path through one or more other DP accelerators in the group.

Figure 5A:
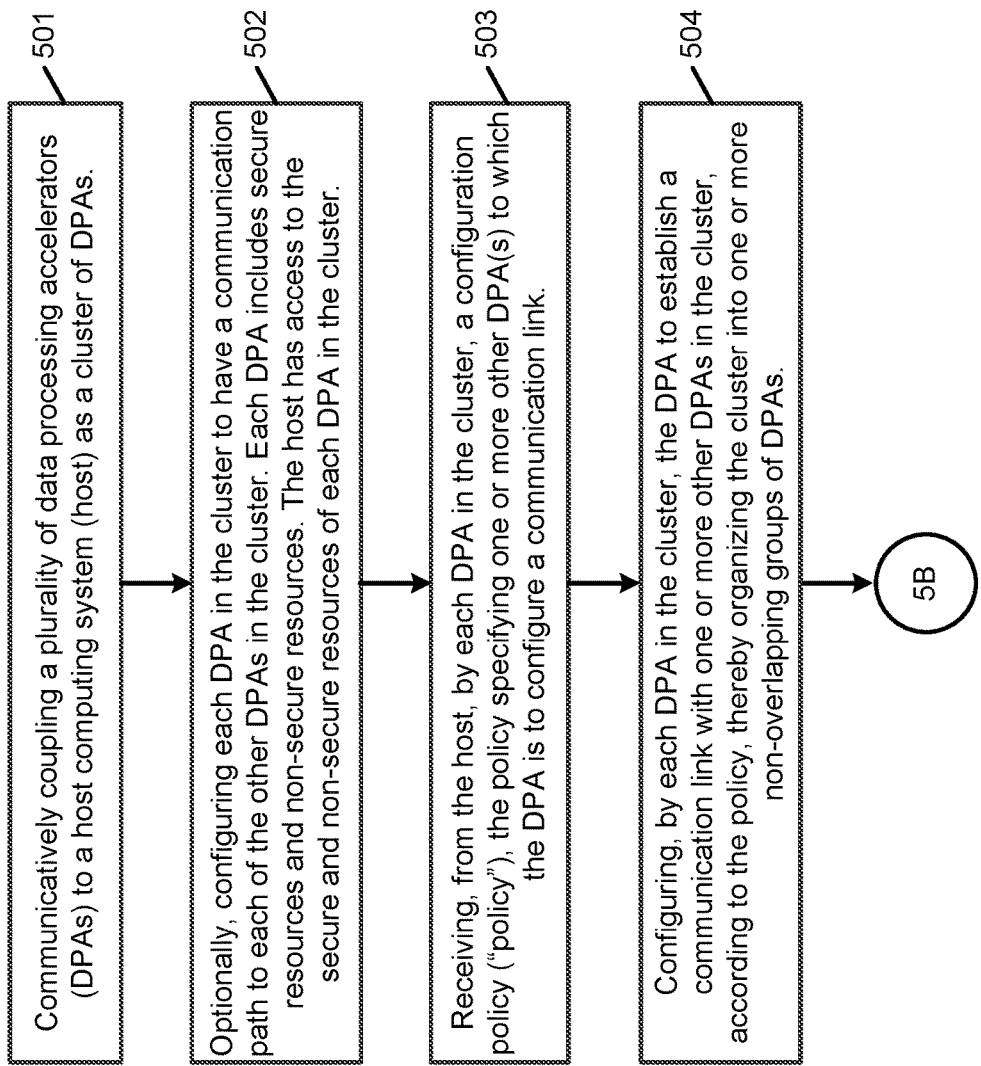
FIGS. 5A and 5B are block diagrams illustrating a method of protecting data in a cluster of data processing accelerators that are partitioned according to a policy, according to an embodiment.
Figure 5B:
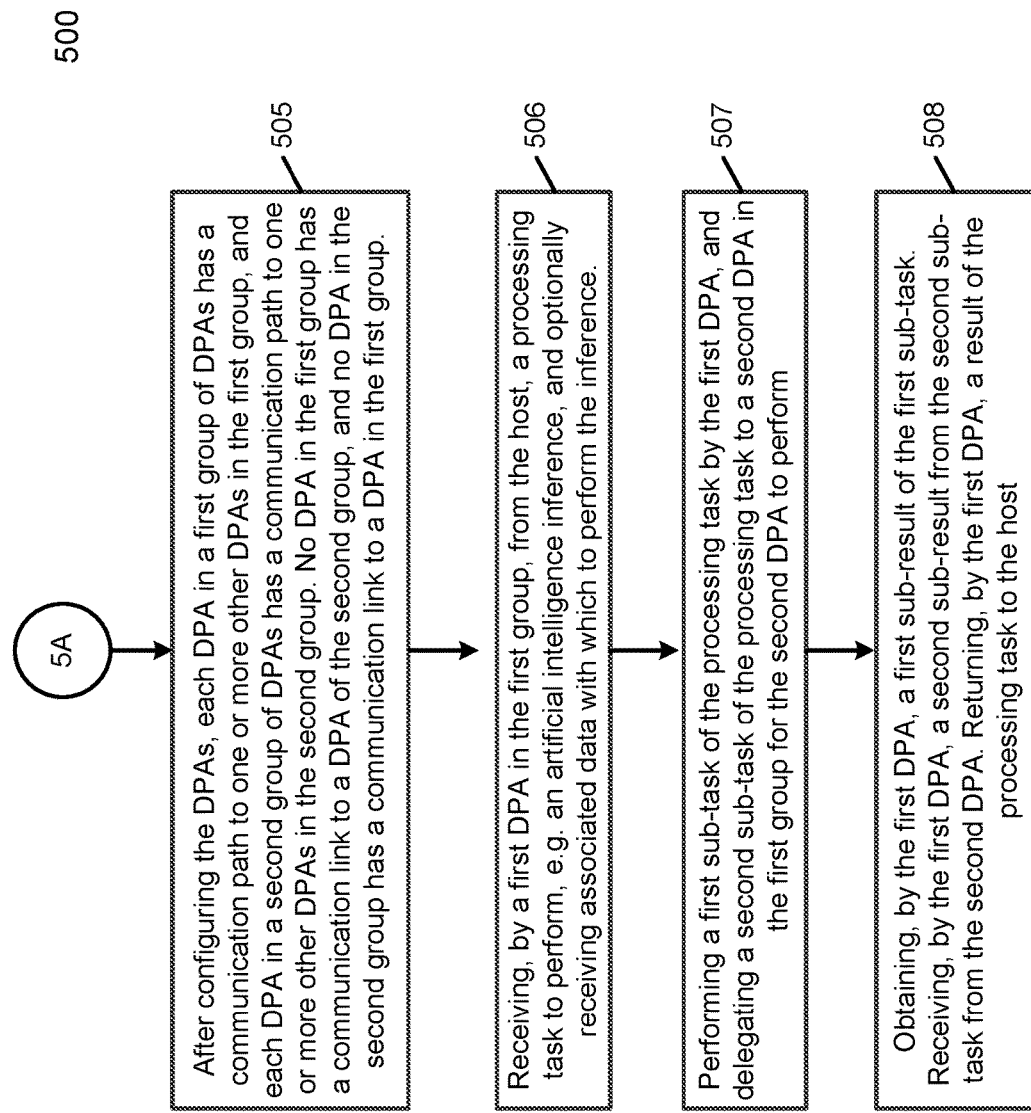

FIGS. 5A and 5B are flow diagrams illustrating a method 500 of protecting data in a cluster of data processing accelerators that are partitioned according to a static partition policy, according to an embodiment. The method 500 is an example implementation of a static policy-based partition of data processing (DP) accelerators into one or more groups within a cluster of DP accelerators.

Referring now to FIG. 5A, in operation 501 a plurality of data processing (DP) accelerators are communicatively coupled to a host device as a cluster of DP accelerators.

In operation 502, optionally, by default, each of a plurality of DP accelerators can configure itself to have a communication path to all DP accelerators in the cluster. Each DP accelerator has both secure and non-secure resources. A driver, e.g. driver 209, in the host system, e.g. host 104, has access to all resources of all DP accelerators in the cluster, including secure and non-secure resources of each DP accelerator in the cluster.

In operation 503, each of a plurality of DP accelerators receives a same configuration policy from the host system. The configuration policy includes configuration instructions for all DP accelerators in the cluster as to which DP accelerator(s) each DP accelerator is to configure a communication link.

In operation 504, each DP accelerator in the cluster establishes a communication link (link up) with one or more other DP accelerators in the cluster, according to the policy, thereby organizing the cluster in to one or more non-overlapping groups of DP accelerators.

In operation 505, after all DP accelerators are configured in accordance with the policy, each DP in a first group of DP accelerators has a communication path to one or more other DP accelerators in the first group. Each DP accelerator in a second group of DP accelerators has a communication path to one or more other DP accelerators in the second group. No DP accelerator in the first group has a communication link to a DP accelerator of the second group, and no DP accelerator of the second group has a communication link to a DP accelerator in the first group.

In operation 506, a first DP accelerator can receive, from the host device, a processing task to perform, such as an artificial intelligence (AI) inference. The first DP accelerator can optionally also receive data with which to perform the processing task.

In operation 507, a first DP accelerator in a first group performs a first sub-task of the processing task, and the first DP accelerator delegates a second sub-task of the processing task to a second DP accelerator in the first group for the second DP accelerator to perform.

In operation 508, the first DP accelerator obtains a first sub-result of the first sub-task. The first DP accelerator also receives a result of the second sub-task from the second DP accelerator. The first DP accelerator returns a result of the processing task to the host device.

Figure 6:
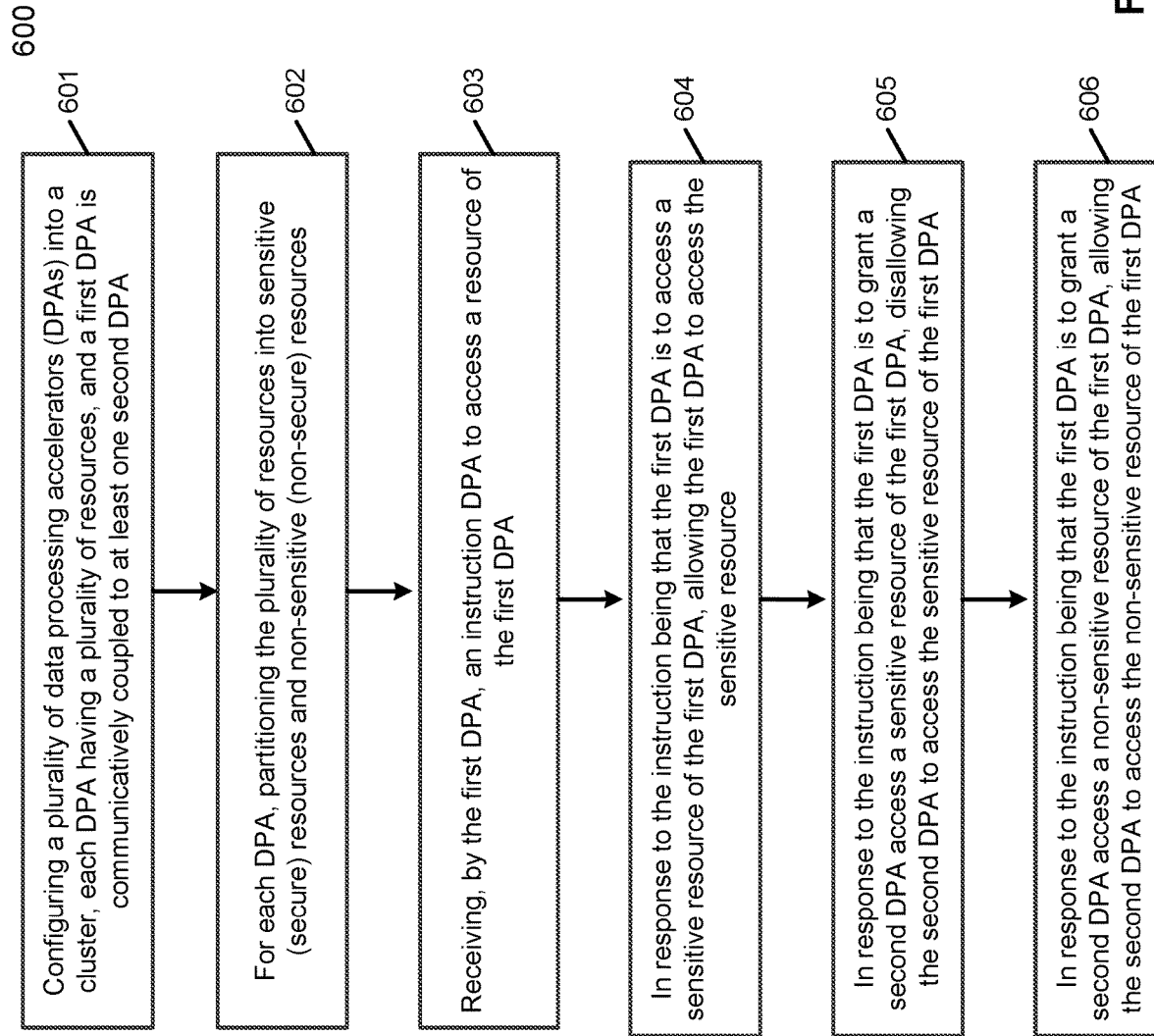
FIG. 6 is a block diagram illustrating a method of protecting data in a cluster of data processing accelerators using resource partitioning per accelerator, according to an embodiment.

FIG. 6 is a flow diagram illustrating a method 600 of protecting data in a cluster of data processing (DP) accelerators using resource partitioning per accelerator, according to an embodiment. Method 600 is directed to firmware or hardware-based partition of sensitive and non-sensitive resources within each partition. Such partitioning can be a part of a manufacturing process of the DP accelerators. Resource partitioning can be enforced by, e.g., resource manager 282, as described above with reference to FIG. 2B.

In operation 601, a plurality of DP accelerators are organized as a cluster. Each DP accelerator is communicatively coupled to a host device. Each DP accelerator has a plurality of resources. A first DP accelerator in the cluster is communicatively coupled (link up) with at least one second DP accelerator.

In operation 602, for each DP accelerator, the plurality of resources are partitioned into sensitive (secure) resources and non-sensitive (non-secure) resources. In one embodiment, the sensitive resources can occupy a first address range of a DP accelerator and non-sensitive resources can occupy a second, non-overlapping address range of the DP accelerator.

In operation 603, a first DP accelerator can receive an instruction from the host device to access a sensitive resource of the first DP accelerator. For example, the host device may instruct the first DP accelerator to store an artificial intelligence (AI) model into secure storage of the first DP accelerator. In another example, a second DP accelerator may request that the first DP accelerator access the sensitive resources of the first DP accelerator, such as to request that the first DP accelerator perform an AI inference on a model stored in the secure memory of the first DP accelerator.

In operation 604, in response to the instruction being that the first DP accelerator is to access a sensitive resource of the first DP accelerator, the first DP accelerator accesses its own sensitive resource.

In operation 605, in response to the instruction being that the first DP accelerator is to grant a second DP accelerator access to a sensitive resource of the first DP accelerator, the first DP accelerator denies the second DP accelerator access to the sensitive resource of the first DP accelerator. For example, if the instruction to the first DP accelerator, from the second DP accelerator, were for the first DP accelerator to read an AI model from sensitive memory of the first DP accelerator and transmit the AI model to the second DP accelerator, this instruction would be denied by the first DP accelerator.

In operation 606, in response to the instruction being that the first DP accelerator is to grant a second DP accelerator access to a non-sensitive resource of the first DP accelerator, the first DP accelerator permits the second DP accelerator to access the non-sensitive resource.

Figure 7A:
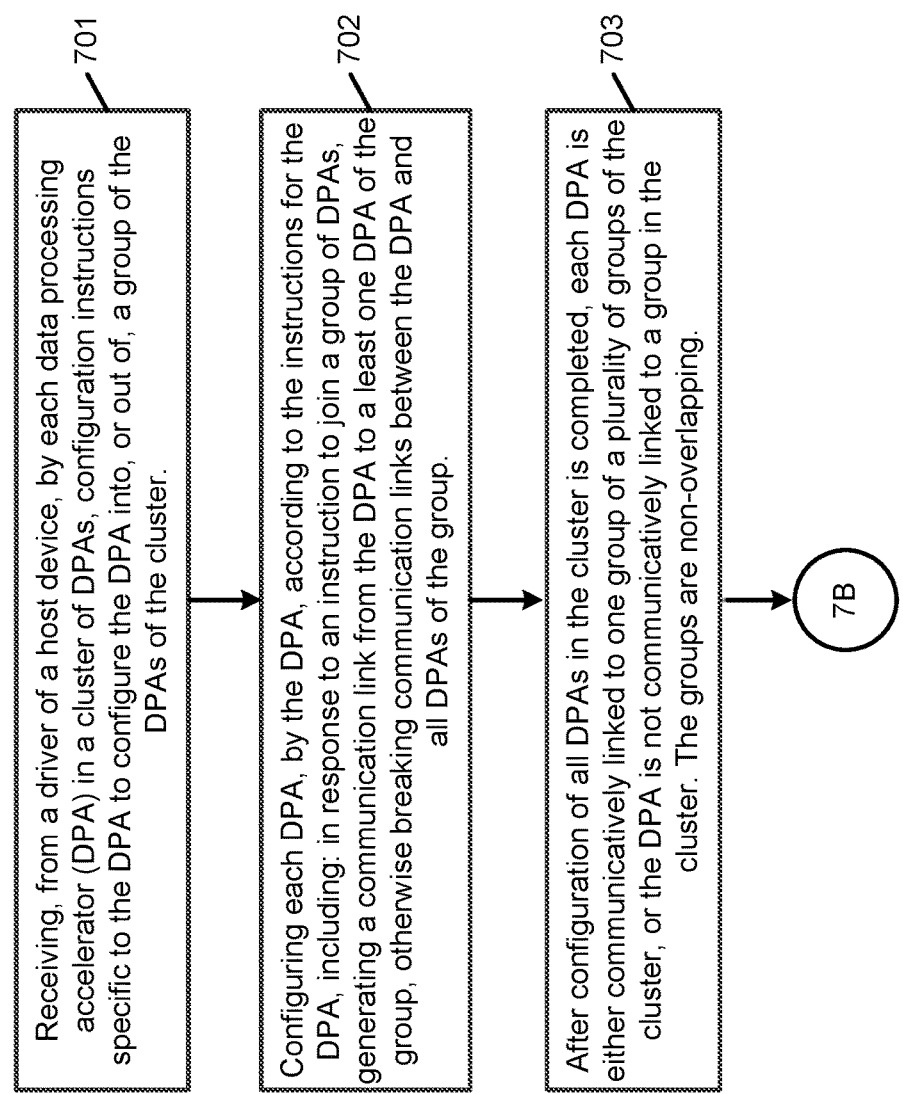
FIGS. 7A and 7B are block diagrams illustrating a method of protecting data in a cluster of data processing accelerators using dynamic partitioning of the accelerators, according to an embodiment.
Figure 7B:
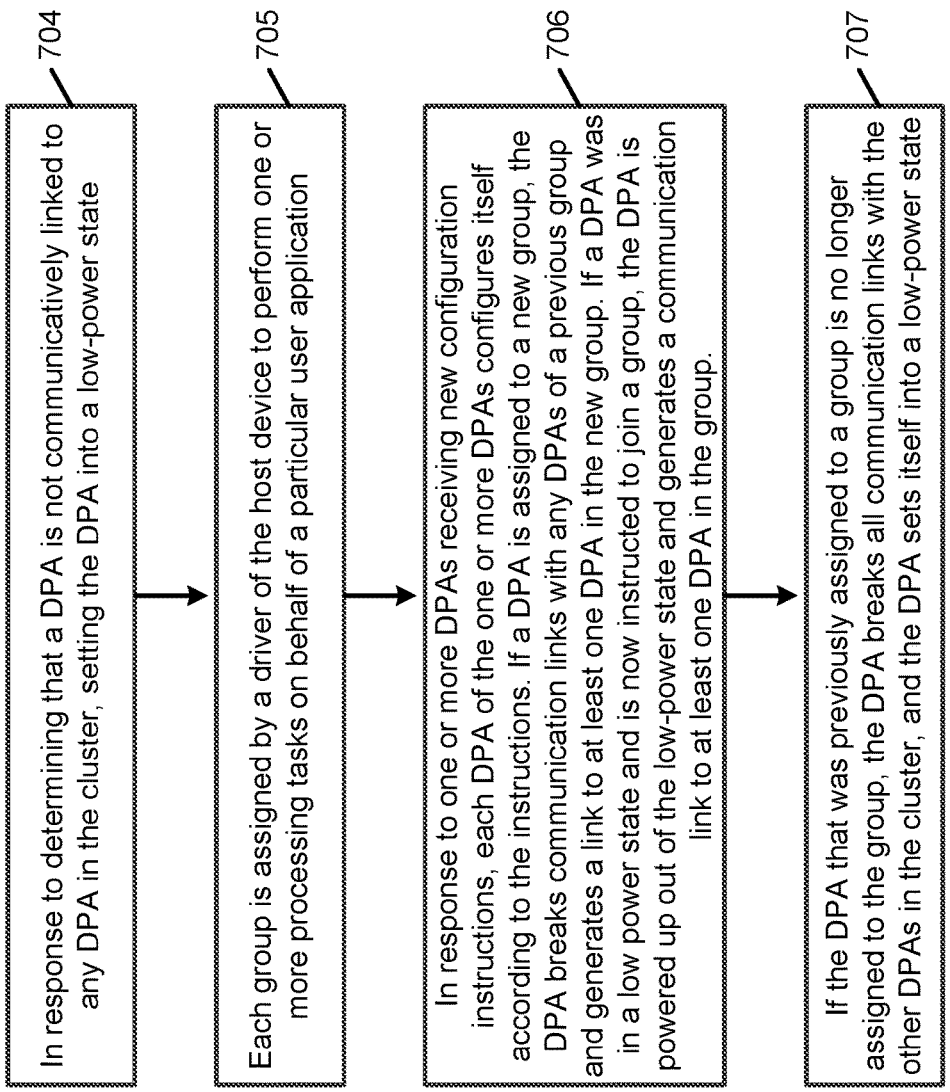

FIGS. 7A and 7B are flow diagrams illustrating a method 700 of protecting data in a cluster of data processing accelerators using dynamic partitioning of the accelerators, according to an embodiment. In dynamic partitioning, a host device can individually configure each DP accelerator in a cluster of DP accelerators via a policy that is specific to the DP accelerator. In dynamic partitioning, DP accelerators of a cluster can be partitioned into groups, and each group can be assigned to one user or one application. A scheduler, e.g. scheduler 209A, of a driver, e.g. driver 209, of a host device does not schedule the processing tasks by time-slicing of multiple users into one group of DP accelerators. One group (partition) is allocated to one user. The number of DP accelerators in any particular partition can vary.

In one embodiment, an analyzer, e.g. analyzer 209B, can analyze the processing tasks in scheduler 209A to determine an optimal grouping/partitioning of DP accelerators. Host device can generate a configuration policy for each DP accelerator, based upon the analysis of the processing tasks in the scheduler. In the dynamic partition embodiment, one or more DP accelerators can be unlinked (link down) from a group in the cluster, and set into a low-power mode. Alternatively, one or more unlinked DP accelerators can be allocated processing tasks to perform one DP accelerator.

In operation 701, each DP accelerator receives a policy containing configuration instructions that are specific to the DP accelerator, from a driver of a host device. The configuration instructions indicate whether a DP accelerator is to join, or leave, a group of DP accelerators. The instructions are specific to the DP accelerator that receives the instructions.

In operation 702, each DP accelerator configures itself according to the instructions for that DP accelerator, received from the host device. Configuration includes: in response to an instruction to join a group of DP accelerators, the DP accelerator generating a communication link (link up) to at least one DP accelerator in the group of DP accelerators, otherwise the DP accelerator breaking communication links (link down) between the DP accelerator and all DP accelerators in the group of DP accelerators.

In operation 703, after configuration of all DP accelerators in the cluster is completed, each DP accelerator is either communicatively linked to one group of DP accelerators of a plurality of groups of DP accelerators in the cluster, or the DP accelerator is not communicatively linked to any group of DP accelerators in the cluster. The plurality of groups of DP accelerators in the cluster is non-overlapping.

Referring now to FIG. 7B, in operation 704, in response to determining that a DP accelerator is not communicatively linked to any DP accelerator in the cluster, the DP accelerator can be set to a low-power state to reduce energy consumption and reduce generated heat.

In operation 705, host device assigns each group of DP accelerators to a user or an application on the host device. One or more of the groups of DP accelerators performs one or more processing tasks on behalf of the user or application to which each of the one or more groups of DP accelerators was assigned.

In operation 706, in response to one or more DP accelerators receiving new configuration instructions from the host device, each of the one or more DP accelerators configures itself according to the instructions for that DP accelerator. If a DP accelerator is assigned to a new, or different, group of DP accelerators, the DP accelerator breaks communication links (link down) between the DP accelerator and any DP accelerators in a previous group of DP accelerators that the DP accelerator was previously instructed to join. The DP accelerator generates a communication link (link up) with at least one DP accelerator of the new, or different, group of DP accelerators specified in the new or different instructions to the DP accelerator. If the DP accelerator was not previously a member of any group of DP accelerators, and was in a low-power state, then the DP accelerator is powered up out of the low-power state, and the DP accelerator generates a communication link to at least one DP accelerator that is a member of the group that the DP accelerator has been instructed to join.

In operation 707, if the DP accelerator was previously assigned to a group, and based on the newly received instructions is no longer assigned to the group, the DP accelerator breaks all communication links (link down) with any DP accelerator in the cluster. The DP accelerator can set itself into a low-power state. In one embodiment, the received instructions can contain an instruction that the DP accelerator is not to enter a low-power state, even though the DP accelerator is not currently a member of any group. In such an aspect, the DP accelerator remains ready to receive work from the driver of the host device, enabling the host device to assign work to an ungrouped DP accelerator. Method 700 ends.

Figure 8:
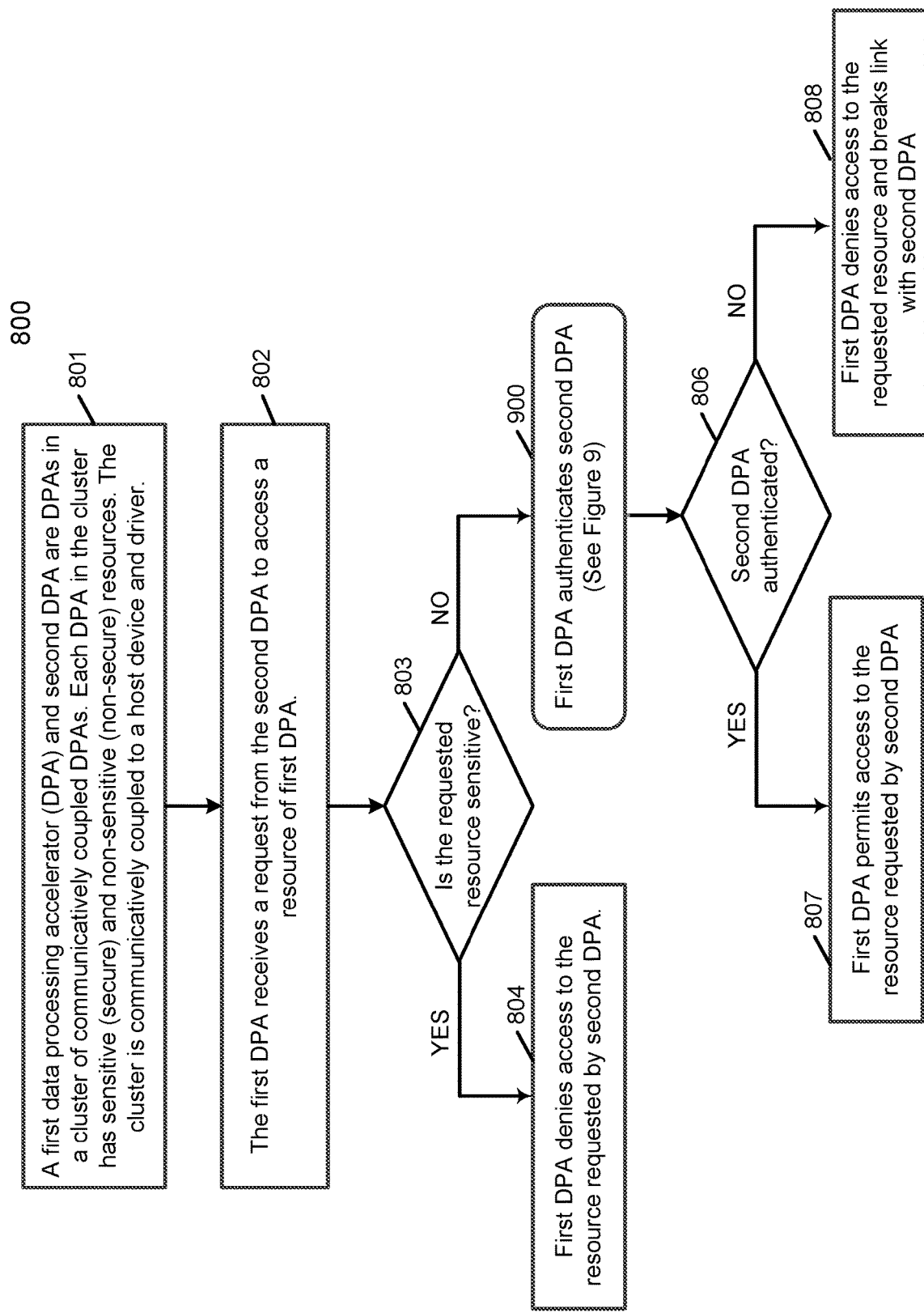
FIG. 8 is block diagram illustrating a method of protecting data in a cluster of data processing accelerators using authentication of a data processing accelerator, according to an embodiment.

FIG. 8 is flow diagram illustrating a method 800 of protecting data in a cluster of data processing accelerators using authentication of a data processing accelerator, according to an embodiment. In this embodiment, it is foreseeable that a data processing (DP) accelerator may be added to a cluster of DP accelerators, and the added DP accelerator may be from an unknown source, or an untrusted third party. Before the DP accelerator is allowed access to any resource of a first DP accelerator, the untrusted second DP accelerator is authenticated by the first DP accelerator.

In operation 801, a cluster of DP accelerators contains at least two DP accelerators: a first DP accelerator and a second DP accelerator. The first and second DP accelerators may be grouped into a same group of DP accelerators. Each DP accelerator in the cluster has sensitive (secure) resources and non-sensitive (non-secure) resources. All DP accelerators in the cluster are communicatively coupled a host device. The first and second DP accelerators are also communicatively coupled to each other.

In operation 802, the first DP accelerator receives a request from the second DP accelerator to access a resource of the first DP accelerator.

In operation 803, it is determined whether the resource requested by the second DP accelerator is a sensitive resource. The determination can be made by, e.g., resource manager 282 as described above with reference to FIG. 2B. If the resource requested by the second DP accelerator is a sensitive resource, then in operation 804 the first DP accelerator denies access to the sensitive resource by the second DP accelerator and method 800 ends. Otherwise, method 800 continues at operation 900.

In operation 900, the first DP accelerator authenticates the second DP accelerator. Operation 900 is described below, with reference to FIG. 9.

In operation 806, it is determined whether the first DP accelerator successfully authenticated the second DP accelerator. If so, then in operation 807 the first DP accelerator permits the second DP accelerator access to the resource request by the second DP accelerator. Otherwise, in operation 808 the first DP accelerator denies access by the second DP accelerator to the resource requested by the second DP accelerator.

Figure 9:
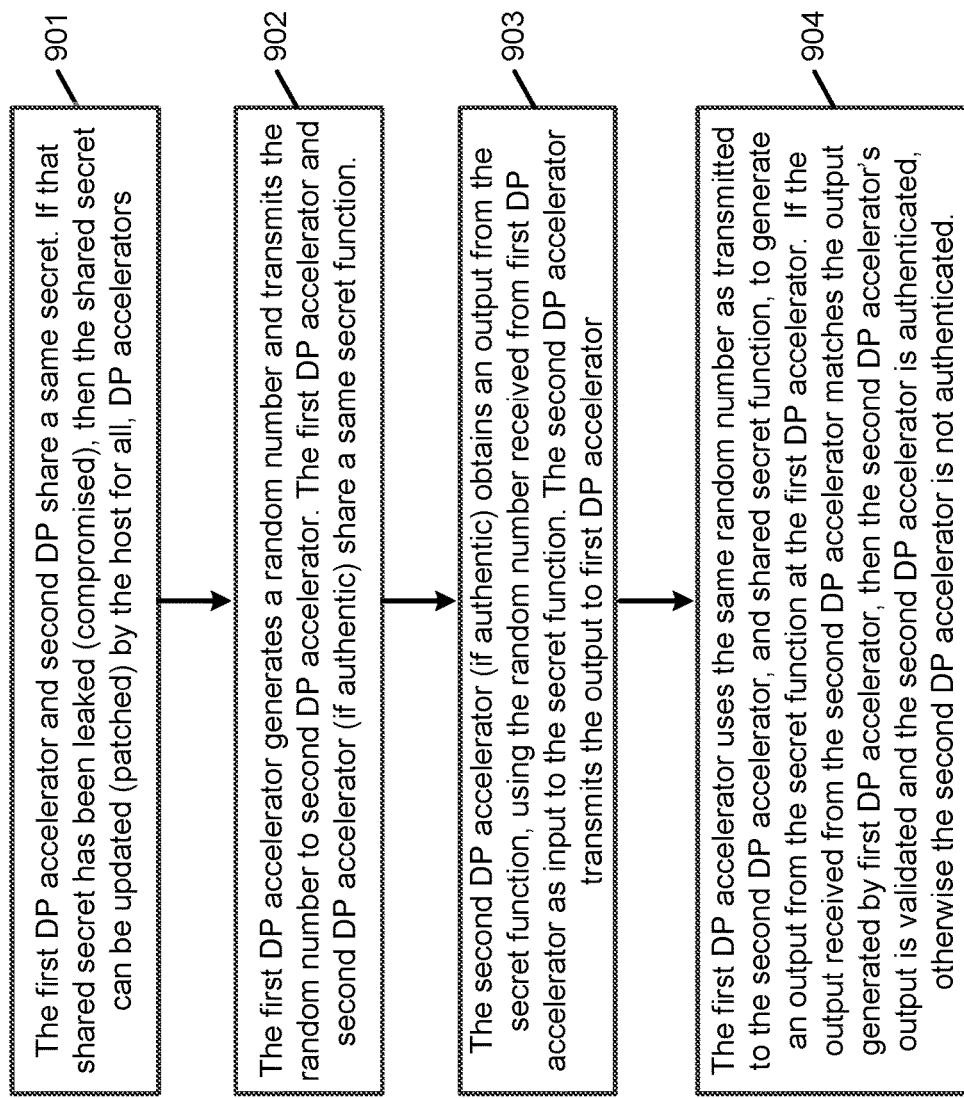
FIG. 9 is a block diagram illustrating a method of authenticating a data processing accelerator, according to an embodiment.

FIG. 9 is a flow diagram illustrating a method 900 of a first DP accelerator authenticating a second DP accelerator. Method 900 can be called by any DP accelerator. A typical use case is that method 900 is called from method 800, to determine whether a second DP accelerator will be permitted to access a resource of a first DP accelerator. Method 800 is described above with reference to FIG. 8.

Authentication is premised on both the first and second DP accelerators having a same shared secret function, which trusted DP accelerators all have. The secret function is a one-way function. The function cannot be discerned from an output of the function. The function can be a hash function and may contain a secret string. In an embodiment, the secret function is embedded into authentic DP accelerators during manufacturing of the DP accelerators.

The first DP accelerator and second DP accelerator share a same secret function. In operation 901, if the shared secret has been leaked (compromised), then the host can update (patch) all DP accelerators in the cluster with an updated shared secret.

In operation 902, the first DP accelerator generates a random number and transmits the random number to the second DP accelerator that is to be authenticated. The first and second DP accelerators, if authentic, share a same secret function.

In operation 903, the second DP accelerator, if authentic, obtains an output from the secret function, using the random number received from the first DP accelerator as input to the secret function. The second DP accelerator transmits the output of the secret function to the first DP accelerator.

In operation 904, the first DP accelerator validates the output received from the second DP accelerator to determine whether the second DP accelerator is authentic. The first DP accelerator uses the same random number that was transmitted to the second DP accelerator, as input to the secret function on the first DP accelerator. The first DP accelerator obtains an output from the secret function on the first DP accelerator. If the output received from the second DP accelerator matches the output generated by the secret function on the first DP accelerator, then the second DP accelerator is deemed authenticated, otherwise the second DP accelerator is not authenticated. Method 900 ends, and returns to a method that called method 900 with a status of the second DP accelerator as authenticated or not authenticated.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of configuring a cluster of data processing accelerators (DPAs) comprising a plurality of DPAs communicatively coupled to a host device, the method comprising:
   receiving, from a driver of the host device at a DPA in the cluster, configuration instructions specific to the DPA that indicate whether to configure the DPA into, or out of, a sub-group of a plurality of sub-groups of DPAs in the cluster, wherein the driver receives processing requests from a plurality of virtual machines and determines a configuration policy comprising the configuration instructions based on an analysis of the processing requests, and wherein the configuration policy optimizes a throughput of the cluster; and
   configuring, by the DPA, the DPA according to the configuration instructions specific to the DPA, including:
      in response to the configuration instructions specific to the DPA indicating that the DPA is to join a sub-group of DPAs, generating, by the DPA, a communication link to at least one DPA in the sub-group; and
      in response to the configuration instructions specific to the DPA indicating that the DPA is to be removed from the sub-group of DPAs, breaking, by the DPA, communication links between the DPA and all other DPAs in the sub-group, wherein responsive to the breaking, the DPA enters a standby state.

2. The method of claim 1, wherein, when the configuring of all of the DPAs in the cluster are completed, each one of the DPAs is either communicatively linked to a single one of the sub-groups of the plurality of sub-groups of DPAs in the cluster, or the DPA is not communicatively linked to any sub-group of DPAs in the cluster.

3. The method of claim 1, wherein each one of the sub-groups is assigned to perform one or more computing tasks for a particular user of the cluster.

4. The method of claim 1, wherein the sub-groups are non-overlapping.

5. The method of claim 1, further comprising:
   in response to determining that the DPA is instructed to join a different sub-group, breaking a communication link to a previous sub-group, and generating a communication link to a DPA of the different sub-group; and
   in response to determining that the DPA is in the standby state and that the DPA is instructed to join a sub-group, powering up the DPA out of the standby state and generating a communication link to at least one DPA in the sub-group.

6. A data processing accelerator (DPA), comprising:
   a link configuration module to:
      receive, from a driver of a host device, configuration instructions specific to the DPA that indicate whether to configure the DPA into, or out of, a sub-group of DPAs in a cluster from a plurality of sub-groups in the cluster, wherein the driver receives processing requests from a plurality of virtual machines and determines a configuration policy comprising the configuration instructions based on an analysis of the processing requests, and wherein the configuration policy optimizes a throughput of the cluster; and;
      configure the DPA according to the configuration instructions specific to the DPA, including:
         in response to the configuration instructions specific to the DPA indicating that the DPA is to join a sub-group of DPAs, generate, by the DPA, a communication link to at least one DPA in the sub-group, and
         in response to the configuration instructions specific to the DPA indicating that the DPA is to be removed from the sub-group of DPAs, break communication links between the DPA and all DPAs in the sub-group, wherein responsive to the break, the DPA enters a standby state.

7. The DPA of claim 6, wherein, when the configuring of all of the DPAs in the cluster are completed, each one of the DPAs is either communicatively linked to a single one of the sub-groups of the plurality of sub-groups of DPAs in the cluster, or the DPA is not communicatively linked to any sub-group of DPAs in the cluster.

8. The DPA of claim 6, wherein each one of the sub-groups is assigned to perform one or more computing tasks for a particular user of the cluster.

9. The DPA of claim 6, wherein the sub-groups are non-overlapping.

10. The DPA of claim 6, wherein the link configuration module is further to:
   in response to determining that the DPA is instructed to join a different sub-group, break a communication link to a previous sub-group, and generate a communication link to a DPA of the different sub-group; and
   in response to determining that the DPA is in the standby state and that the DPA is instructed to join a sub-group, power up the DPA out of the standby state and generate a communication link to at least one DPA in the sub-group.

11. A processing system having at least one hardware processor, coupled to a memory programmed with executable instructions that, when executed by the at least one hardware processor, causes the at least one hardware processor to perform operations of configuring a cluster of data processing accelerators (DPAs) comprising a plurality of DPAs communicatively coupled to a host device, the operations comprising:
   receiving, from a driver of the host device at a DPA in the cluster, configuration instructions specific to the DPA that indicate whether to configure the DPA into, or out of, a sub-group of a plurality of sub-groups of DPAs in the cluster, wherein the driver receives processing requests from a plurality of virtual machines and determines a configuration policy comprising the configuration instructions based on an analysis of the processing requests, and wherein the configuration policy optimizes a throughput of the cluster; and
   configuring, by the DPA, the DPA according to the configuration instructions specific to the DPA, including:
      in response to the configuration instructions specific to the DPA indicating that the DPA is to join a sub-group of DPAs, generating, by the DPA, a communication link to at least one DPA in the sub-group;
      in response to the configuration instructions specific to the DPA indicating that the DPA is to be removed from the sub-group of DPAs, breaking, by the DPA, communication links between the DPA and all DPAs in the sub-group, wherein responsive to the breaking, the DPA enters a standby state.

12. The system of claim 11, wherein, when the configuring of all of the DPAs in the cluster are completed, each one of the DPAs is either communicatively linked to a single one of the sub-groups of the plurality of sub-groups of DPAs in the cluster, or the DPA is not communicatively linked to any sub-group of DPAs in the cluster.

13. The system of claim 11, wherein each one of the sub-groups is assigned to perform one or more computing tasks for a particular user of the cluster.

14. The system of claim 11, wherein the sub-groups are non-overlapping.

15. The system of claim 11, wherein the operations further comprise:
  in response to determining that the DPA is instructed to join a different sub-group, breaking a communication link to a previous sub-group, and generating a communication link to a DPA of the different sub-group; and
  in response to determining that the DPA is in the standby state and that the DPA is instructed to join a sub-group, powering up the DPA out of the standby state and generating a communication link to at least one DPA in the sub-group.

\* \* \* \* \*